(12) United States Patent
Schwartz

(10) Patent No.: US 12,131,659 B2
(45) Date of Patent: *Oct. 29, 2024

(54) SYSTEM FOR INDIVIDUALIZED DATA EDUCATION

(71) Applicant: Alan N. Schwartz, Edmonds, WA (US)

(72) Inventor: Alan N. Schwartz, Edmonds, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/358,887

(22) Filed: Jul. 25, 2023

(65) Prior Publication Data

US 2023/0368684 A1 Nov. 16, 2023

Related U.S. Application Data

(63) Continuation of application No. 17/700,306, filed on Mar. 21, 2022, now Pat. No. 11,756,442, which is a continuation of application No. 16/865,258, filed on May 1, 2020, now abandoned.

(60) Provisional application No. 62/846,442, filed on May 10, 2019.

(51) Int. Cl.
| | |
|---|---|
| *G09B 1/32* | (2006.01) |
| *G06F 3/01* | (2006.01) |
| *G06F 3/16* | (2006.01) |
| *G09B 5/12* | (2006.01) |

(52) U.S. Cl.
CPC .............. *G09B 1/325* (2013.01); *G06F 3/011* (2013.01); *G06F 3/017* (2013.01); *G06F 3/167* (2013.01); *G09B 5/12* (2013.01)

(58) Field of Classification Search
CPC ........... G09B 1/325; G09B 5/12; G06F 3/011; G06F 3/017; G06F 3/167
See application file for complete search history.

(56) References Cited

U.S. PATENT DOCUMENTS

2017/0214963 A1* 7/2017 Di Franco .......... H04N 21/4227

* cited by examiner

*Primary Examiner* — Andrey Belousov
(74) *Attorney, Agent, or Firm* — Leonid Kisselev

(57) ABSTRACT

A system is described. A computing processor is configured to: represent recorded data capable of being consciously experienced by a user through a sensory form as an indexed sequence and maintain the indexed sequence; provide the recorded data to the user in the sensory form while the user is being monitored for a plurality of points in the indexed sequence at which electrical neural signals as evoked by the user in reaction to the providing of the recorded data, are captured; pair the signals with portions of the recorded data corresponding to the plurality of points at which the signals were evoked and reorganize the recorded data as categorized by the signals; measure and analyze the signals to identify one or more physiologic responses that fall below the levels of self-awareness and cognitive awareness; and inform the user of the one or more physiologic responses.

28 Claims, 14 Drawing Sheets

Fig. 11.

Process can include any digital format as starting point

Examples can include not restricted to:

| 61 Auditory ⟹ Visual |
| 62 Visual ⟹ Auditory |
| 63 Visual & Audio ⟶ Visual / Audio |

| 64 Auditory ⟹ Auditory (e.g. different language) |
| 65 Visual Can be movie or static ⟹ Visual (e.g. color blindness, visual impairment, different language) |

66 Sensory can be integrated into or can be a separate unit format (e.g. replace or be in place of auditory or visual)

SYSTEM FOR INDIVIDUALIZED DATA EDUCATION

FIELD

This application relates in general to data education and, in particular, to a system for individualized data education system.

BACKGROUND

Currently, there is no method or device or program for synchronizing, personalizing and optimizing digital and/or analog data at the point of use by a human.

This invention is a device and method for synchronizing, personalizing, manipulating, organizing, and optimizing digital and analog data at the point of use by a human. This invention is a unique individualized system that involves the encoding and processing of media, data, formats, and information when presented in different forms and formats to the human for processing, input, output, and capture by the human body and brain. One or more than one human and computer, processor and device can work in conjunction to accomplish the tasks, herein. Each human manipulates, to include but not restricted to outputs, inputs, captures, processes, stores, organizes media uniquely.

Data, formats, and information processing varies from individual to individual, yet current technology has few to no devices, methods or programs to allow for integration of data in a personalized individualized manner across different media, data, or information formats in a manner that uniquely reflect how brains process and encode media, data, information and formats. Some of these challenges are recognize and some understood but much remains to be discovered. This invention addresses how humans can individualize the interface between media and the human experience.

By giving an individual the tools and technology to experiment and work to optimize and 'tweak' their own individual learning and processing style, an individual can learn what optimally 'works for them. One example can include but is not restricted to a humans with sensory, brain, physiologic, and body limitations and challenges such as dyslexic individual who must uniquely learn for themselves, how his or her own unique input, learning and encoding method works regarding how to read, learn, and write. The education system as well-meaning as it may be, given its limited resources and approaches often fails to develop methodologies for these individuals with their unique brain functioning. This invention by creating a uniquely individualized method, device and program of data capture, processing, organization, input, and output will provide the human user with a device and method that collects, captures, inputs, integrates, processes, organizes, synchronizes, expresses and outputs differing formats in a manner that specifically suits that individual.

One of the projected purposes of this invention is to progress the 'one or two-ways-fits-all' constructs of current technology and to move more to a structure of media, information, data, and format input, output, sharing, processing, manipulation, and capture that then can be organized to fit the unique needs of each human user's strengths and limitations and methods of inputting, processing and learning. It will allow each unique brain to experiment with organizational tools that transcend the one media, data, information, and formats currently present, in a way that the user finds more effective, efficient, enjoyable, entertaining and accessible to that user's unique brain function.

This invention will also be of significant value to individuals with challenges in to include but not restricted to processing human deficiencies to include but not restricted to learning, reading, dyslexia, visual, auditory, word, picture, sound, non-visual and non-auditory senses, rates of change of data and capacity to store long and short-term data, stages of dementia and Alzheimer's.

This invention will also be of significant value to individuals with gifted or more singularly developed skill in to include but not restricted to learning, reading, dyslexia, visual, auditory, word, picture, sound, non-visual and non-auditory senses, rates of change of data and capacity to store long and short-term data, and enriched learning.

In addition, to the manner in which a human consciously to include but not restricted to inputs, processes, organizes, manipulates, and outputs data, and how humans are knowingly affected, effected, and influenced by these conscious processes, there is the manner in which a human non-consciously, without full conscious awareness, to include but not restricted to reflexively, automatically, physiologically, and sensorially reacts and responds to the data that can influence how humans to include but not restricted to inputs, processes, organizes, manipulates, and outputs data, and how humans are unknowingly affected, effected, and influenced by these non-conscious processes. In this invention both the conscious and the non-conscious processes can serve as means for synchronizing, personalizing, manipulating, organizing, and optimizing digital and analog data for and of use by humans and in conjunction with their machines, devices, computers, and processors. Conscious usually involves conceptual awareness of cognition that can include some thoughts, some mental events and some emotions of which humans are aware. Non-conscious is less than fully awareness or obscured awareness of processes that can include some thoughts, some mental events and some emotions of which the human is less than fully cognitively aware or from which a human's cognitive processes and consciousness are partially or fully obscured. In lay terms non-conscious awareness can be referred to as but not restricted below the level of self-awareness and cognitive awareness and conscious is often referred to as but not restricted to at or above the level of self-awareness and cognitive awareness.

SUMMARY

The subject is the personalization, individualization, integration, facilitation, and the cross-referencing of data marking, selecting and effective and efficient retrieval of data when using one or more forms of digital information and analog information.

The invention consists of a one or more than one methods, components, and computer programs that track and synchronize data from differing media, data, presentations, and information formats. That data can be indexed to correspond to include but not restricted to match similar, near similar, or identical data set across the various data formats. In one embodiment, each phrase in an audio book is indexed to match that similar, near similar, or identical phrase in a digital visual wordbook.

Thus, data in one format can be precisely retrieved from a different format. The User can then perform a function to include but not restricted to mark, identify or signify a to include but not restricted to a portion, segment, or section of the data that the User wishes to identify for the User's personal use. This personalized, individualized data from one format can then be identified and sequestered or copied from or between to include one or multiple other formats of data. This data can include but is not restricted to at least one of be identified and processed to include but not restricted to on, onto, or from to include but not restricted to the original data, copied to a component of the original data, copied to a buffer or storage component that can have short to long term capacities and locations. The data in one or more locations and formats can then be to include but not restricted to be to include to be processed, reformatted, and manipulated and altered, to include but not restricted to be optimized, personalized, manipulated, and individualized for the utilization of the first user or to a second user.

A second user can mean more than one user. The manner in which the data is manipulated and altered can include but is not restricted to creating the best or the desired effect of the user to include but not restricted to manipulating the presentation of the data in a manner that can include but is not restricted to the user's preferences, faculties, facilities enjoyment, retrieval, education, learning, and individual processing given that individual users have varying methods of brain function, retrieval, memory, input, capture, output, storage, encoding, modifying and processing.

The goal is to coordinate multiple forms of digital information in a manner personalized by the user for the user and for sharing the information with other users that reflects the initial and additional users.

Currently, there is no method for humans to interface with multiple forms of digital data in an effective and efficient manner.

Listening to an audiobook and wanting to remember the section of the book heard and create notes of that section and wanting to correlate it to the digital written text. Currently, there is simply no way to do this since the digital methods are not synced up to each other. The current digital modes are independent and are restricted most commonly to cut and paste as exemplified by removing and moving text from a text document.

Humans by nature choose the easiest or quickest route, especially if it is the most efficient route or method. A device or program or method that can create a more efficient function will overtime be chosen as optimal for both efficiency and effectiveness.

One example, can include but is not restricted to if you are listening to an audiobook and you come across a quote or a section you wish to remember. If you are riding in a car or bicycle or walking or engaged in another task and you do not have an opportunity or way such as but not restricted to a pencil and paper, the analog tool, or a digital tool such as but not restricted to a simple digital means of transcription or you do not want to remove your attention from the task, 'click or push' a button, and transcribe the idea or section or quote, you either lose the section or have to go back to that section and re-find it in the audio or search through sections of the audio which is time consuming and can be difficult.

The time and the expenditure of effort may be such that you do not take the time or bother with undertaking that task. If there was a simple way to as you listen to the audiobook to segregate or catalogue or find the reference in the world literature and save the section or segment or reference then you would easily have that section or segment or reference for future reference without having to perform a separate time consuming re-playing and searching and re-finding of the data. If the data was removed and stored and catalogued and cross referenced with to include but not restricted to other references and sections and segments of to include but not restricted to that first said data and other data that are not that first said data, then the process of searching, learning and integration of information and data would occur more efficiently to include but not restricted to fewer or even just one process, treatments or steps.

In another example, it may be desirable to outline and tag or make note of the audio component not only in audio data but to also simultaneously outline or tag the audio-identified section in a digital book, or transcript or a video data presentation or movie of that audio section that was tagged. This device and method allow for to include but not restricted to fewer or even one unit of effort to accomplish multiple tasks—thus creating a more efficient and effective use of human time and resources and which creates greater accuracy and a greater probability that the task will be performed and completed.

One example can include but is not restricted to a human is listening to digital audio data. The human marks which includes but is not restricted to wherein where the marking includes but is not restricted to indicates, outlines, designates, tabs, and tags the data, which then defines a digital media data set, which then through a component of the device is capable of to include but not restricted performing a function on the digital media data sets that coordinates, correlates, synchronizes, remembering, defining, and assigns correspondence to the marked section of the first data set to at least a second section of a data set by a method or program or device. In another embodiment of marking the audio data can be marked on at least one of to include but not restricted to the device, the digital audio data and the program data.

This marking method can then to include but not restricted to mark, correlate, and identify the same section in a format other than the first audio wherein that can include but is not restricted to a digital written data to include but not restricted to a digital book or digital pictorial or image data that can include but is not restricted to a movie or podcast. This representative embodiment can include making to include but not restricted to at least one and several marked audio sections. At the end of the audio book or article there can include but is not restricted to there being a file with audio sections representing the marked audio sections that can be played back and there can be a transcription of these sections that can be read to include but not restricted to alphanumerically displayed, pictorially displayed and auditorily spoken and there can be to include but not restricted to a digital book with the sections outlined, corresponding, referenced, and designated to correspond to the marked audio section.

The marked and tagged data can include but is not restricted to media data corresponding to but not restricted to an audio file, a podcast, a video, an image, a book, a video section or any combination thereof—all of which can be marked and can be tagged for to include but not restricted to inputs and outputs, which include but are not restricted to auditory, visual and other forms of sensory perceiving, observing, sensing and viewing. One or more processes, inputs and outputs can include but is not restricted to having the sections from one or more media forms being summarized, integrated, organized, and arranged to create a personalized method for viewing and reviewing and sharing these data sections that are personalized to include but not restricted to the user or another user or a target user and personalization can be performed by any combination of a human and a processor and a combination of human and processor. A similar process can be applied to include but not restricted to first marking the auditory data, the visual written data, book, the visual picture, image data or other sensed human information and data that can be input, output, captured, viewed, heard and sensed by a human.

Personalized sections can be organized and manipulated into units to include but not restricted to unique grouping that can reflect but are not restricted to groupings that are conscious and thought out by the human and are part of the analytic process and can be non-conscious processes that are physiologic and sensory that the human may not be fully aware of and that the human may only be partly aware of and can include but are not restricted to sensory and physiologic responses that can include but are not restricted to pupillary size, expressions both micro and macro, gestures, galvanic changes, blood flow, pulse, body thermal changes, chemical, oxygenation, and hormonal changes, neural sympathomimetic and para sympathomimetic and human signals electromagnetic—such as but not restricted to EEG (electroencephalographic) and EMG (electromyographic) signals, magnetic resonance, and axonal signals and these signals physiologic, biological, and sensory signals by the human can be used to organize, catalogue and group data in a manner that may not be consciously perceived by a human. In one embodiment, if the physiology and sensory responses of the human change form baseline while reading or listening to music, the section of the information can be marked and stored and grouped based on to include but not restricted to a physiologic and sensory change such as but not restricted to a profile to include but not restricted to a less rapid heartbeat and pulse, slow deep breathing, and a PaO2 monitor, drop in blood pressure from baseline and this combination can be organized as a separate category, which can be personalized to elicit a similar response in the future, while all of this falls below the conscious level and may not analytically engender a cognitive or sensory awareness but may represent relaxation to that personal human and this data can be acquired from a device that can sense and measure but is not restricted to a pulse-oximeter, a respiratory gauge and a blood pressure detector and this information can be received and transmitted to a device that can and is programmed to mark and store and organize a section of data for future retrieval based on these sensory and physiologic changes rather than a conscious human action.

In another, embodiment the user can be perusing a dating site looking at pictures and reading profiles or listening to the voice of a potential new mate while the user is wearing a to include but not restricted to a sensing device such as a watch or finger probe and while having a smartphone or sensing device capture physiologic responses and in one example to include but not restricted to the user's pupils may dilate, the facial micro-expression may show joy, and the pulse may quicken and blood pressure and pulse increase and in this example a storage, processing, and computing device records these responses. The user may or may not be consciously aware of these responses. The device can organize and make know and group these individuals into a category that can be later reviewed by the user to ensure that the user was aware of this heightened state, which may represent attraction. This data can be stored with the profile of the potential mate and can serve as a sorting mechanism for future potential partners. A feedback process could include to inform, stimulate, warn, and bring to the attention a positive, negative and a neutral response physiologic and sensory response to a potential dating candidate.

In another example of the marking there can be a hybrid of digital and analog that can be performed even on a standard or digital movie by examining the any combination to include but not restricted to speech, audio, acoustic wave, which can be correlated with the audio signal of the analog movie. This may require an added step of converting or correlating an analog component and data into a form or signal that can communicate with the digital program. Some examples can include but are not restricted to analyzing the audio waveform of the analogue movie or performing to include but not restricted to face, pictorial, and image recognition on an analog data. This analog to digital conversion step is a different embodiment of the fundamental invention of digital-to-digital marking and personalization of data and information.

Notes or excerpts from forms of media such as but not restricted to word documents by cut and paste' can currently be created and a word document can be searched for a key word with the 'find' feature. This invention and method allow for an audio word document and the section of the audiobook to be found with key words of varying forms and formats of media and then save those words and highlight those words to your personalized notes and listen to them again as your own personalized synopsis or outline of the book and then in a coordinated manner find that same section of data to include but not restricted to in the audio, written, video, and pictorial portion of the data.

This can be used for but not limited to research, homework, pleasure, to create your own personalized library of ideas, phrases or quotes, to create a section of data which you choose to further review and for remembering, sharing, outlining, and communicating your ideas, thoughts, emotions, and feelings to yourself and with others in a personalized summarized manner to include but not restricted to multiple data formats to include performing this correlative marking to include simultaneous or non-simultaneous means.

Digital data, content, and communications interface with human beings in a digital to human manner. Data, media formats and forms and communication interface with humans in an analogue to human manner. Advantages and disadvantages exist for both interfaces with humans.

Human beings currently are forced with compromising how they interface and interact with both digital and analog data and communication. Human beings are aware of some of their thoughts but not all are perceived and many thoughts remain partially aware or partially or non-conscious. Physiologic, sensory and body responses that are subtle or not well detected to include but not restricted to shifting blood flow to different organs, differences between diastolic and systolic blood pressure, early muscle changes, and energetic responses to include but not restricted to electromagnetic, chemical, thermal and mechanical body and organ functions often go poorly or undetected and differ from standard analytic and emotional conscious categories such as happiness, and sadness, calmness and thus these body responsive categories form unique, distinct, and separate, grouping from traditional analytic groupings and thus provide human individuals as well as human-human and human-machine interactions with a unique approach to include but not restricted to assessing, teaching, sharing, interacting, understanding, manipulating, organizing and processing data.

DEFINITIONS

As a definitional overview data and its corresponding terms media, formats, and information can be analog or digital.

Digital data forms can include but are not restricted digital data, documents, information and content. This will include but is not restricted to digital communication in the broadest manner to include but not restricted to words, symbols, pictures, sound, music, auditory, tactile, sensory, and perceptual information, content and data transmitting, holding, placing, depositing, storing and receiving devices and methods:

to include but not restricted to digital visual alphanumeric, symbolic, and character forms; and to include but not restricted to digital auditory and acoustic systems to include but not restricted to music, spoken, instrumental, computer and synthesizer/computer-like generated auditory elements to include but not restricted to sounds, tones, resonances, pitches, symbols, verbal and non-verbal features and words; and to include but not restricted digital visual imagery static and non-static to include but not restricted to still, changing or moving images, representations, photos, movies and other visual data, representations, performances, events and experiences that can be digitally captured, portrayed, rendered, or created; and to include but not restricted to one or more than one combination of digital formats; and to include but not restricted to any combination, thereof.

Data can be non-digital and take the analog form. Non-digital data forms can include but are not restricted non-digital data, documents, information and content. This will include but is not restricted to non-digital communication in the broadest manner to include but not restricted to words, symbols, pictures, sound, music, auditory, tactile, sensory, and perceptual information, content and data transmitting, holding, placing, depositing, storing and receiving devices and methods:

to include but not restricted to non-digital visual alphanumeric, symbolic, and character forms; and to include but not restricted to non-digital auditory and acoustic systems to include but not restricted to music, spoken, instrumental, computer and synthesizer/computer-like generated auditory elements to include but not restricted to sounds, tones, resonances, pitches, symbols, verbal and non-verbal features and words; and to include but not restricted non-digital visual imagery static and non-static to include but not restricted to still, changing or moving images, representations, photos, movies and other visual data, representations, performances, events and experiences that can be non-digitally captured, portrayed, rendered, or created; and to include but not restricted to one or more than one combination of non-digital formats; and to include but not restricted to any combination, thereof.

Digital data can be converted to the non-digital analog form and non-digital analog data can be converted to the digital form. The two forms can cohabitate and co-exist within this device and technology.

Data can take the form to include but not restricted to an output, storage, place holder, a deposit, an input, capture, and any combination of these.

Hybrid information, devices and data may include combined digital with analog information or transitional components of digital and analog data and may include but is not restricted to gestures that are visualized or felt.

Marking can be defined as but is not restricted to marking, identifying, indicating, outlining, designating, defining, coding, encoding, correlating, coordinating, remembering, defining, outlining, and assigning. Marking can include but is not restricted to marking a position, a point and a section or of to include but not restricted to a format, a communication, data, information, and content. Marking can include but are not restricted to a data set which identifies a precise and set length and location of the section of data to be marked; and the marking can be an alterable data set length and location of the section to be marked and this alterable marked data can be to include but not restricted to being designated by a user or a processor by a one or more than one prompt, switch, and signal, that can include but not restricted to determine, assess, and capture the length and location of the section and data set as well as its activation, beginning, start and its end, commencement, and end and to include but not restricted to forming the data section, unit, and segment.

Sensory human input, capture, and output data can include but is not restricted to human inputs, captures, and outputs and sensing or awareness of such data to include but not restricted to spoken, sound, acoustic, auditory, visual, smell, taste, vestibular, and touch and its related skin or surface components such as but not restricted to pain, light touch, thermal awareness, baroawareness, firm touch, proprioception, motion detection, vibration, and combinations of human senses and awarenesses. Sensory and physiologic data that can be used for personalizing a and profiling data can include but not restricted to unique grouping that can reflect but are not restricted to groupings that are not conscious and not thought out by the human and are part of the not analytic process and can be non-conscious processes that are physiologic and sensory that the human may not be fully aware of and that the human may only be partly aware of and can include but are not restricted to sensory and physiologic responses that can include but are not restricted to pupillary size, expressions both micro and macro, gestures, sweat, galvanic changes, blood flow, pulse, body thermal changes, and to include but not restricted to skin, sweat and mucosal chemical and hormonal changes, as well as neural sympathomimetic and para sympathomimetic and human signals electromagnetic—such as but not restricted to EEG (electroencephalographic) and EMG (electromyographic) signals, magnetic resonance, and axonal signals and these signals physiologic, biological, and sensory signals by the human can be used to mark, choose sections, organize, catalogue and group data in a manner that may not be consciously or fully consciously perceived by the awareness of a human at the time.

Sensory input, output, and capture is considered neural when it involves a living being and the sensory input, output, and capture of a human being. Analog data requires a transition from analog to digital or neural. Digital information requires in most cases from digital to analog to neural by creating images or sounds or even heat or an electromagnetic signal even when the digital signal excites the neural tissue directly. In one embodiment which includes but is not restricted to, an implanted electrode that carries a digital or analog signal which can be considered a transitional signal and therefore might be considered within either the analog or digital category. For definitional purposes such a neural excitation, activation, transmission or reception or signal, transitional signal, can be considered and defined within either category of analog or digital. In one embodiment, the neural input, output, and capture of the neural excitation, activation, transmission or reception or signal, transitional signal, can include but is not restricted to be from a human. In another embodiment, the neural input, output, and capture of the neural excitation, activation, transmission or reception or signal, transitional signal, can include but is not restricted to be from a device. In another embodiment the neural input, output, and capture of the neural excitation, activation, transmission or reception or signal, transitional signal can come from a human, and from a device, and from a combination of a human and a device. To include but not restricted to the neural input, output, and capture of the neural excitation, activation, transmission or reception and signal, transitional signal and any combination of these can be referred to as a neural signal. To include but not restricted to input, output, and capture of to include but not restricted to excitation, activation, transmission or reception and signal, transitional signal and any combination of these can be referred to as a neural signal.

Sensory and neural signal input, output, and capture and it's of the neural excitation, activation, transmission or reception and signal, transitional signal and any combination of these can be referred to as a neural signal.

Signals from a human can include but are not restricted to electrical, magnetic, electromagnetic, chemical. thermal, mechanical, air movement, sound, vibration, and pressure and can include but are not restricted to the signals of other senses to include but not restricted to sensory, neural, and the bodies processes and functions which can be used as a signal.

Signals from a living being and a device can include but are not restricted to sensory signals and sensations to include but not restricted to visual, auditory, olfactory, gustatory, tactile, pain, proprioceptive, tactile; as well as electrical, magnetic, electromagnetic, chemical. thermal, mechanical, to include but not restricted to movement, sound, ultrasound, vibration, kinetic, tactile, proprioceptive, pain, and pressure and can include but are not restricted to the signals of or that simulate human functions, neural transmitter and receiver processes, communicating processes and bodily function methods, and senses to include but not restricted to sensory, neural, and the bodies processes and functions which can be output, captured and received and transmitted as a signal going to or coming from the living user's body or going to or coming from a processor. These input and output signals can be personalized to the user. Sensory and physiologic data that can be used for personalizing a and profiling data can include but not restricted to unique grouping that can reflect but are not restricted to groupings that are not conscious and not thought out by the human and are part of the non-analytic process and can be non-conscious processes that are physiologic and sensory that the human may not be fully aware of and that the human may only be partly aware of and can include but are not restricted to sensory and physiologic responses that can include but are not restricted to pupillary size, expressions both micro and macro, gestures, sweat, galvanic changes, blood flow, pulse, body thermal changes, and to include but not restricted to skin, sweat and mucosal chemical and hormonal changes, as well as neural sympathomimetic and para sympathomimetic and human signals electromagnetic—such as but not restricted to EEG (electroencephalographic) and EMG (electromyographic) signals, magnetic resonance, and axonal signals and these signals physiologic, biological, and sensory signals by the human can be used to mark, choose sections, organize, catalogue and group data in a manner that may not be consciously or fully consciously perceived by the awareness of a human at the time.

Signals can include but are not restricted to the capacity to input, output, transmit, receive, communication, and interact, and to be any combination of these and can include but are not restricted to the examples described and related to the examples herein this patent.

Within this patent are, to include but not restricted to examples and embodiments of numerous bodily functions, methods and processes, which are representative. These embodiments are representative and not meant to be restrictive or limiting.

Some representative embodiments to mark, to prompt, or to serve as a switch can include but are not restricted to sensory, neural, and other bodily functions and processes of a human.

One embodiment of a human signal is a neural signal. Neural signals can be central and predominantly related to the brain and its nerves and peripheral and predominantly related to the spine and its multitude of nerves which can include afferent and efferent sensory and motor nerves and neural structures extending throughout the body. Neural signals and processes can include but are not restricted to neural excitation, activation, transmission or reception. The neural process can create electromagnetic that can be captures by a receiver that can include but is not restricted to a transmitting and a receiving sensor, device, and electrode. This can be placed upon a body part to include but not restricted to the skull, a muscle, and the skin. When an area of the brain is activated, or when a muscle and the skin is excited a signal is registered and this can be used to perform, activate, and complete the mark of the data location.

Another embodiment of a human signal is a mechanical or movement gesture or tactile process. Embodiments can include but are not restricted to placing a transmitting and receiving sensor that can detect movement, change in position, pressure, and proprioception.

Another embodiment of a human signal is a mechanical or movement of air, such as in the bodily function of speech or respiration Embodiments can include but are not restricted to placing a transmitting and receiving sensor that can detect movement of air or the creation of sound or words.

Another embodiment of a human signal is a mechanical or movement of fluid, such as in the bodily function of blood flow. Embodiments can include but are not restricted to placing a transmitting and receiving sensor that can detect movement of blood flow.

Some representative embodiments to mark, to prompt, or to serve as a switch can include but are not restricted to a device producing a signal that informs sensory, neural, and other bodily functions and processes of a device.

One embodiment of a device signal is an electrical signal that is detected by body and skin nerves.

Another embodiment of a device signal is a mechanical, vibration and movement signal that is detected by body and skin nerves.

Another embodiment of a device signal is a sensation to include but not restricted to a light or a sound signal that is detected by the eyes and the ears respectively.

In one preferred embodiment, a human listener, user, can come upon a section of an audiobook, digital audio data and that listener may wish to remember or take note of the section. The listener can mark that section of data. In one case the section may be a paragraph with an interesting quote. The user identifies the length and location of the section to be marked. The marked section of the audiobook, digital audio data can be deposited into to include but not restricted to a computer, a processor, and a buffer in the form of an audio file, digital audio data that can be auditorily played or replayed. The marked section can have to include but not restricted to a mark, designation, and tag such that the section can be easily to include but not restricted to recalled, referenced, located, and found. The tagged marked section can be converted to include but not restricted to a word, text, alphanumeric, and symbol document and file that can be analog or digital or a combination of analog or digital.

The audio file, digital audio data can be to include but not restricted to be indexed, referenced and located to include but not restricted to match, to correlate, and to correspond to a digital data to include book, document, or text from which it is being read. Once the tagged marked section is identified its location can be found in the digital book and the tagged marked section of the audio file, digital audio data that corresponds to the digital word-book can be identified.

The signal from to include but not restricted to the body and the device transmit and receive device can communicate with to include but not restricted to a computer, a processor, hardware, software, the human, the human sensor device, and any combination of these.

Data, content, and information can also include and be defined to include human generated and non-human animal created as well as non-animal generated to include but not restricted to data and information and man-made instruments, computers and nature produced data, signals, information or any combination of these.

The term book is used in the broadest sense to refer to any communication form or format. A book can refer to any media form that is listened to or viewed or sensed as a data unit or reference and can include but is not restricted to a book, written material, a magazine, an article, a phrase, a word or series of words, or symbols or pictures, a recording, a record, music, sound or series of sounds that can include but are not restricted to a song or group of songs instrumental, computer, nature, and human generated, music, spoken words or language or communication, or sensory data to include but not restricted to communication through gestures or tactile and touch forms and sensations, smell and olfactory, taste and gustatory, thermal and other forms of communication of humans to include but not restricted to interaction with the User, one's self, other humans, plants, animals, nature, instruments, and computers.

Most of the information can exist but is not restricted to being within the human sensory range but can include non-human sensory ranges to include but not restricted to variations in human perception, biological differences, aging losses and gains in discernment and shall include subliminal inputs and captures, and perceptions including but not limited to the senses, awarenesses, unconscious and subconscious inputs, captures, thoughts, feeling, and outputs and can include but are not restricted to speed of the signal, subliminal messages, electromagnetic energy such as ultraviolet and infrared light sounds above and below the normal human range, subliminal messages, and the human range because of hearing and aging losses and tactile or proprioceptive movements that are subtle and may be detected only with repetition.

Computer or processor, hardware, computer buffer, and software and combinations of these can be associated with to include but not restricted to a display, displaying device and a visual monitor and combination and combinations of these and their components and these terms and meanings can be referred to and used interchangeably.

Copy, store, buffer, and transfer and combination and combinations of these and their components and meanings and these terms can be referred to and used interchangeably.

Computer and processors can include but are not restricted to, computers, processors and their components, and digital buffers and digital storage and software and, hardware and combination and combinations of these and these terms and meanings can be referred to and used interchangeably.

The concept and term, manipulate, can include but is not restricted to being programmed, processed, output, input, captured, processed, stored, organized, alter, copied, encoded, buffered, indexed, marked, and organized and changed by to include but not restricted to an individual and a computer, and it can refer to any additional definition within this disclosure or in standard usage.

Indexing a movie or a podcast or an audiobook can be performed by a point in the digital data that can be considered part of a linear digital index that can be but is not restricted to a being converted to a temporal time stamp based on or independent of real-time, standard clock time, corresponding to the clock-time of which the movie or podcast or audiobook was created and when replayed represents real time, the clock time of creation.

Sequential computer code of a word text that is not spoken or heard is innately independent of time or temporality. Time can be arbitrarily associated with words as one form of indexing a text. A time can be arbitrarily assigned to index the book causing it to be temporal data, in a data set that would otherwise be non-temporal digital data and non-time stamped.

Similarly, a data format that would be considered to be temporal such as a movie or an audio book that is being read out loud that could be considered temporal and can be created without a real-time, time stamp or temporality and can be treated as non-temporal digital data without temporality and thus indexed as sequential digital data.

The correlate can also be considered with is the data being all temporal.

In a unique way of storing and indexing data the data can be treated as and stored to a Fourier transformation and k-space. The text or the images can be treated in a common manner to include but not restricted to as raw data and as a data matrix which can be performed before a Fourier transformation treatment is applied. The images can be treated in the x and y axis as to include but not restricted to phase, space, position, frequency, time, and a gradient across the data. Manipulations to the k-space can be performed by adding filters to include but not restricted to Gaussian, low-pass, special, high pass, and band pass filters. Half and full Fourier processes.

The term human can be interchanged with the term human being, individual, and a living being. Although this invention is first and foremost designed for humans this invention can also include but is not restricted to be able to be used for pets and non-pet, non-human animals and computing devices and processors.

A user to include but not restricted to a human and a computer, processor, and software and hardware learning device, processor, and computer can create a note, highlight, personalized note and learning tool personal or general for viewing, researching, learning, reviewing and sharing data that can but is not restricted to correlate and correspond to but not restricted to marked sections of data, media and encoded software, encoded hardware and encoded data and media.

Human and device signals can to include but not restricted to input, capture, and output data devices for transmit and receive and capture, input, and output can be incorporated into wearables to include but not restricted to modified earbuds and headphones; head, limb and body bands and belts and coverings, and accessories to include but not restricted to watches, bracelets, jewelry, ornaments, clothing and their accessories to include but not restricted to fashion accessories, such as but not restricted to hats, caps, gloves, scarves, and bags. In one embodiment electrodes can be incorporated into the wearables to transmit and receive and capture and output the signals. In another embodiment signals can be utilized to excite and stimulate bodily senses and functions using to include but are not restricted to sensory signals and sensations to include but not restricted to visual, auditory, olfactory, gustatory, tactile, pain, proprioceptive, tactile; as well as electrical, magnetic, electromagnetic, chemical. thermal, mechanical, to include but not restricted to movement, sound, ultrasound, vibration, kinetic, tactile, proprioceptive, pain, and pressure and can include but are not restricted to the signals of or that simulate human functions, neural transmitter and receiver processes, communicating processes and bodily function methods.

Personalized data that has been acquired can be to include but not restricted to organized, referenced, found, searched, and manipulated to include but not restricted to optimize, improve, simplify, and enhance the experience of the user. Categories, grouping, and cataloguing of data for retrieval can include but is not restricted to conscious categories chosen by an individual such as but not restricted to difficult, pleasurable, exciting, and emotionally charged, and it can be non-conscious categories not chosen through conscious awareness but which are chosen by one or more sensory and physiologic changes to include but not restricted to change in heart rate, blood pressure and pupillary size.

Sensory and physiologic data that can be used for personalizing a and profiling data can include but not restricted to unique grouping that can reflect but are not restricted to groupings that are not conscious and not thought out by the human and not fully are part of the analytic process and can be non-conscious processes that are physiologic and sensory that the human may not be fully aware of and that the human may only be partly aware of and can include but are not restricted to sensory and physiologic responses that can include but are not restricted to pupillary size, expressions both micro and macro, gestures, sweat, galvanic changes, blood flow, pulse, body thermal changes, and to include but not restricted to skin, sweat and mucosal chemical and hormonal changes, as well as neural sympathomimetic and para sympathomimetic and human signals electromagnetic—such as but not restricted to EEG (electroencephalographic) and EMG (electromyographic) signals, magnetic resonance, and axonal signals and these signals physiologic, biological, and sensory signals by the human can be used to mark, choose sections, organize, catalogue and group data in a manner that may not be consciously or fully consciously perceived by the awareness of a human at the time.

One method to assist in the enhancement of the personalized experience includes but is not restricted to indexing reference data and materials that are data and materials to include the primary user's data and materials to include but not restricted to the primary user's, secondary user's, a computer and processors, and the clouds or remote storage data and materials and the primary user can have access to these materials. One embodiment to make this data and material accessible is to index the data and materials by a universal indexing system. One of the goals of enhancing the personalized experience is to enhance to include the experiences amongst the primary user, secondary users, computers and processors, and the cloud and cloud like remote storage and any combination thereof.

The indexing can be performed in multiple formats to include but are not restricted to words and text, musical notes, tonal annotation, auditory, audio waves and wave forms, codes, electromagnetic, chemical, valence, and any combination of these formats and these formats can be to include but not restricted to a digital, an analog, a wave, an electromagnetic and a chemical form and any combination. The indexing method and format can be the same as the original data format and the indexing method and format can be a method and format that differs from the original data.

One representative embodiment can include but is not restricted to a digital word text that can be the original data and can be the method and format for indexing when it is compared to other digital word text references. A processor can compare a first section of digital words to at least a second section of digital words for similarity and congruence. In this embodiment the source data is digital word text and the index is digital word text.

Another representative embodiment can include but is not restricted to audio or image or a combination of these data that can be the original data and the method and format for indexing is digital word text. If the sound and image is accompanied by the spoken word, then the words can be compared and synchronized and serve as common index points when the audio text is compared to other digital word text and other digital audio references. A processor can compare a first section of digital words to at least a second section of digital words for similarity and congruence. In this embodiment the source data is digital audio text and the index is digital word text and the word text can be compared to other word text indices which can be then converted to include but not restricted to digital word text, digital audio word data and other forms of imaging word text to include but no restricted to movies, podcasts, videos, motion pictures, still and continuous pictures and images and any combination of these.

Another representative embodiment can include but is not restricted to audio or image with music or a combination of these data formats that can be the original data and the method and format for indexing is a digital sequence that is audio data. If the sound and image is not accompanied by the spoken word, then the sound can be compared and synchronized and serve as common index points when the image and audio data is compared to other digital image and digital audio references. A processor can compare a first section of digital sound or music to at least a second section of digital sound or music data of digital similarity and congruence. In this embodiment the source data is digital audio and image data and the index is digital audio data and the digital audio data can be compared to other digital audio data indices which can be then converted to include but not restricted to digital word text, digital audio word data and other forms of imaging word text to include but no restricted to movies, podcasts, videos, motion pictures, still and continuous pictures and images and any combination of these.

Another representative embodiment can include but is not restricted to a source data of a text with or without digital sound, music and image data; audio data with or without digital text and image data; and images with or without digital text or audio data or a combination of these data formats that can be the original data and the method and format for indexing can be a digital sequence that is a predetermined and a universal indexing system that can be applied to, to include but not restricted to audio, word text and images data. In one example the source can be music without words, then the music can be compared to other data forms and formats that have common indexing systems. A processor can compare a first section of this digital data to at least a second section of digital data for similarity and congruence. In this embodiment the source data which can be but is not restricted to word text, auditory and image data and a combination of these can be compared to other digital data and this data can be to include manipulated, viewed, heard, sensorially experienced, computed, processed, analyzed, and converted to be personalized by the user to include a first and at least a second, user that can be human, a device and a living being that is not human.

The digital wordbook identification can include highlighting that section of the book corresponding to the initially marked and tagged audio file. The said section of the book can then be stored in a buffer that can be stored in an audio or word or both formats. The digital word book therefore when scanned will have the highlights of the audio marking. Both the audio file and the digital wordbook can have any combination of personalized saved tagged marked sections that can take the form of digital or audio formats. These saved tagged marked sections can then be organized, or saved in a form that best serves the listener or a target listener other than the primary listener.

The same process can be performed where the digital wordbook is marked and made to correlate with the audio file. Any combination of these can be used together and can be used be used combination—the living being can spend part of the time as a reader and part of the time as a listener.

Data can be stored to include long and short-term storage.

Data can be copied and stored in a component of to include but not restricted to the device or in a separate device or the cloud or internet or any combination, which has the capacity to include but not restricted to manipulate, alter, copy, encode, output, input, capture, process, store, and organize to include but not restricted to media, data, formats, and information. Indexed data can be stored to include but not restricted to in the cloud and on a computer and processor, a digital streaming device, an analogue data and an image device to include but not restricted to references and data that can be similar or can differ from the primary data being utilize by the user. The data from the user's device can be compared and referenced to information and data in the cloud, remote storage, or on a processor or computer and manipulated and utilized to personalize the user's experience, knowledge, notes, data and information.

Devices can be composed of one or more than one component and the devices can communicate through standard means of data communication that can include but are not restricted to wired and wireless means.

Data can be manipulated and altered by to include but not restricted to hardware or software or any combination or variant of these. The manipulation and alteration can include but not restricted to visual, acoustical, or by other sense manipulation. The manipulation and alteration can include highlighting, removing a section for later separate viewing, changing size or relativistic perspective of the data, performing calculations and computer processes compared to the other data to include but not restricted to making it larger or smaller, brighter or less bright, louder or softer, of different pitch, of different frequency, different speed, of different tone, timber, or tenor, of a different instrument or accompanying instrument, of different pacing, of different background, of different color, of different font, and of different outline and underline. A component of the device can generate a sensory signal to include but not restricted to change in a thermal hot or less hot or cold quality; change in a tactile element to include but not restricted to pain, vibration, pressure, proprioception, soft or hard touch; change in olfaction or smell or nasal or oral mucosal, taste, gustatory, dry and wet, sweat, galvanic, blood pressure, systolic and diastolic ratios, pulse oxygen levels, PaO2 or skin receptors or stimulants by the release of to include but not restricted to oxytocin, dopamine, or other organic neurochemicals, hormones or amino acid and peptide chains and biologically active chemicals or organic or inorganically active chemicals and compounds; change in taste or gustatory stimulants; and generate a magnetic signal or an electrical signal or an electromagnetic and a brain electroenchaphalographic (EEG) or a muscle electromyographic (EMG) signal and a chemical signal to be delivered to the living body.

Computer and processor can be used interchangeably to include but is not restricted to computers, processor, hardware, computer buffer and storage, microprocessors, CPU's, software transmitters and receivers, inputs and outputs, sensors and combinations and admixtures of these can be utilized to include but not restricted to being for synchronizing, personalizing and optimizing a unique individualized system that fits the encoding and processing of media, data, formats, and information. Computer and processor can be used interchangeably to include but is not restricted to computers, processor, hardware, computer buffer and storage, microprocessors, CPU's, software transmitters and receivers, inputs and outputs, sensors and combinations and admixtures of these can be utilized to include but not restricted to being for manipulating and altering the data, information and media, to include but not restricted to outputs, inputs, capture, processes, stores, organizes media, data, formats, and can include but is not restricted to the ability to customize information from individual to individual in a personalized individualized manner across different media, data, or information formats.

Data, information and media can be inputted captured, and outputted in the form of known physiologic and sensory inputting, capturing, and outputting devices to include but not restricted to audio transmitters and receivers, speakers, microphone, visual capture and transmission devices, cameras, displays, tactile input, capture, and output devices and sensors for temperature, pressure, pain, light and hard touch, proprioception, movement, gestures, output and display and assessment and capture, olfactory and gustatory and taste input, capture and output of that can include but are not restricted to sensory and physiologic responses that can include but are not restricted to pupillary size, expressions both micro and macro, gestures, galvanic changes, blood flow, pulse, body thermal changes, chemical, oxygenation, and hormonal changes, neural sympathomimetic and para sympathomimetic and human signals electromagnetic—such as but not restricted to EEG (electroencephalographic) and EMG (electromyographic) signals, magnetic resonance, and axonal signals and these signals physiologic, biological, and sensory signals by the human can be used to organize, catalogue and group data in a manner that may not be consciously perceived by a human. that chemicals and hormones and peptides and biological compounds that be detected by human and non-human sensory and physiologic mechanisms, organs and devices both conscious and nonfully aware-conscious.

Alphanumeric can include but is not restricted to include numbers and text and word and symbols and these can be used interchangeably.

Analog and digital inputs, captures, and outputs can include but are not restricted to be used together, conjointly, synchronously, simultaneously, separately, side-by-side, overlapped and mutually acquired or displayed.

INVENTION EMBODIMENTS

The following FIGURES are example of embodiments for method and devices for the Individualized Data Education System (IDES) to include but not restricted to aware and conscious and not with full consciously awareness of the human decision, thought and analytic processes. The goals of the IDES Methods and Devices are to include but are not restricted to the integration and synchronization of multiple data, information, and media, and formats for and to include but not restricted modification, individualization and personalization of presented data to and for to include but not restricted to a user, multiple users, a processor, a machine, a computer and any combination of these.

One embodiment provides a system. The system includes a computing processor configured to: represent recorded data capable of being consciously experienced by a user through a sensory form including at least one of vision, sound, smell, taste, and tactile as an indexed sequence and maintain the indexed sequence in a storage device interfaced to the processor; provide the recorded data to the user via an output device that is both operatively coupled to the storage device and capable of reproducing the recorded data in the sensory form while the user is being monitored with a monitor for a plurality of points in the indexed sequence at which electrical neural signals as evoked by the user in reaction to the providing of the recorded data, are captured; pair the captured electrical neural signals with portions of the recorded data corresponding to the plurality of points at which the captured electrical neural signals were evoked and reorganize the recorded data in the storage device as categorized by the captured electrical neural signals; measure and analyze the captured electrical neural signals to identify one or more physiologic responses that fall below the levels of self-awareness and cognitive awareness; and inform the user of the one or more physiologic responses by providing the reorganized recorded data via the output device as personalized to the user's one or more physiologic responses.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 11 is a schematic flow chart of an embodiment of representative formats and their comparison and conversion to similar and different data media formats.

DETAILED DESCRIPTION

Figure 1:
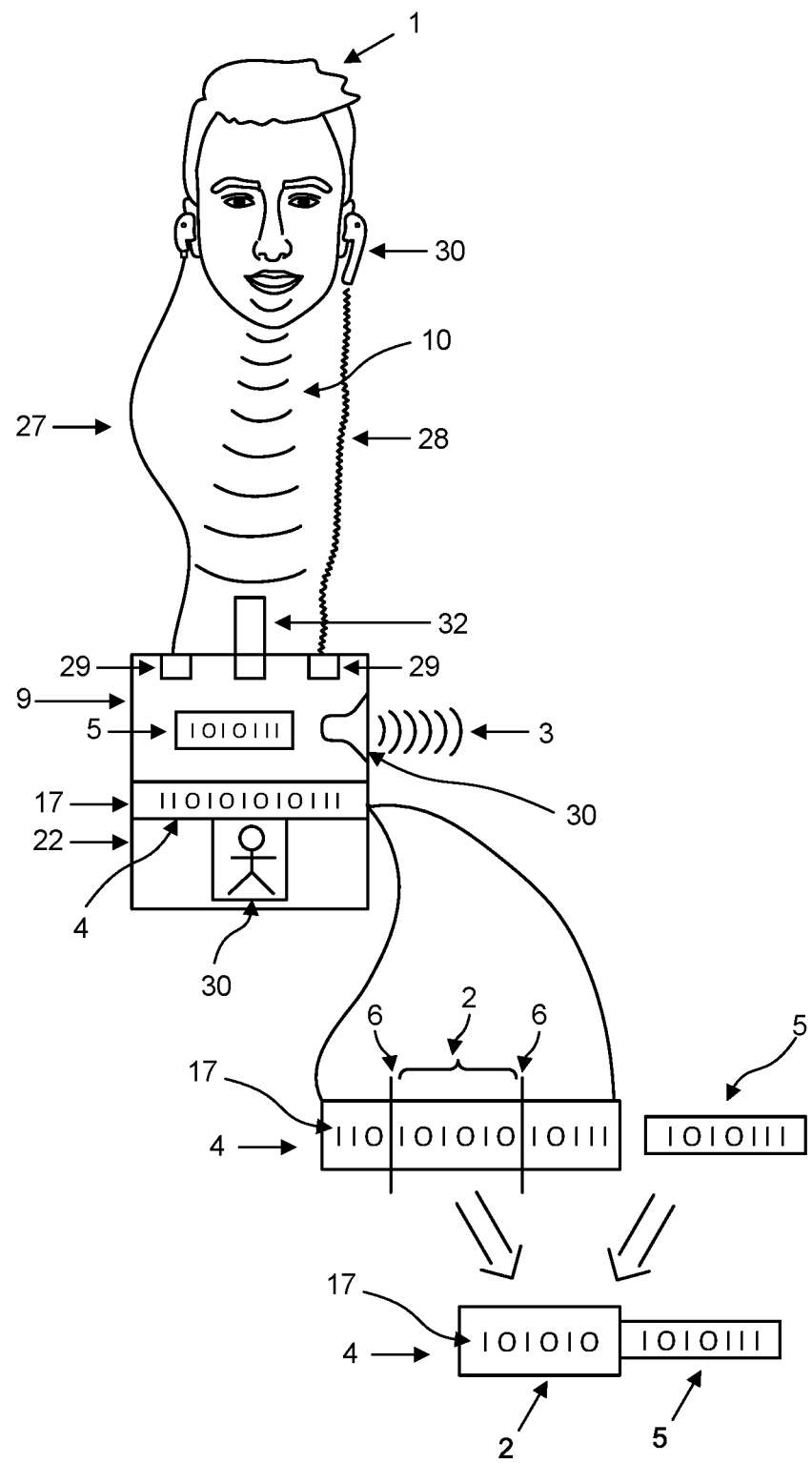
FIG. 1 is a frontal view of a user and a digital data device with an input and an output system with which the user interacts with a display system for perceiving the data and a system for marking the digital data.

FIG. 1 is a frontal view of a user (1) and a digital (17) data (4) device (22) with an input (29) and an output (30) system with which the user interacts with to include but not restricted to a display (30) system for perceiving the data (4) and a system for marking the digital (17) data (4). In one preferred embodiment, a human listener (1), user (1) can come upon a section (2) of an digital audio file or book in the form of a digital (17) audio (3) data (4) device (22) and that listener may wish to remember or take a note (5) to include but not restricted to spoken, written, tactile and electromagnetically of the section (2). The listener can mark (6) that section (2) of data (4). In one case the section (2) may be a paragraph with an interesting quote. Devices (22) can be composed of and can be one or more than one component to include but not restricted to computers (9) and processors (9) and the devices (22) and computers (9) and processors (9) can communicate through standard means of data (4) communication that can include but are not restricted to wired (27) and wireless (28) means to include but not restricted to electromagnetic means to include but not restricted to Wi-Fi, Radiofrequency (RF), optical, laser, Ultraviolet, Infrared and any combinations of electromagnetic energy; and chemical and mechanical and kinetic and heat methods and devices.

Figure 2:
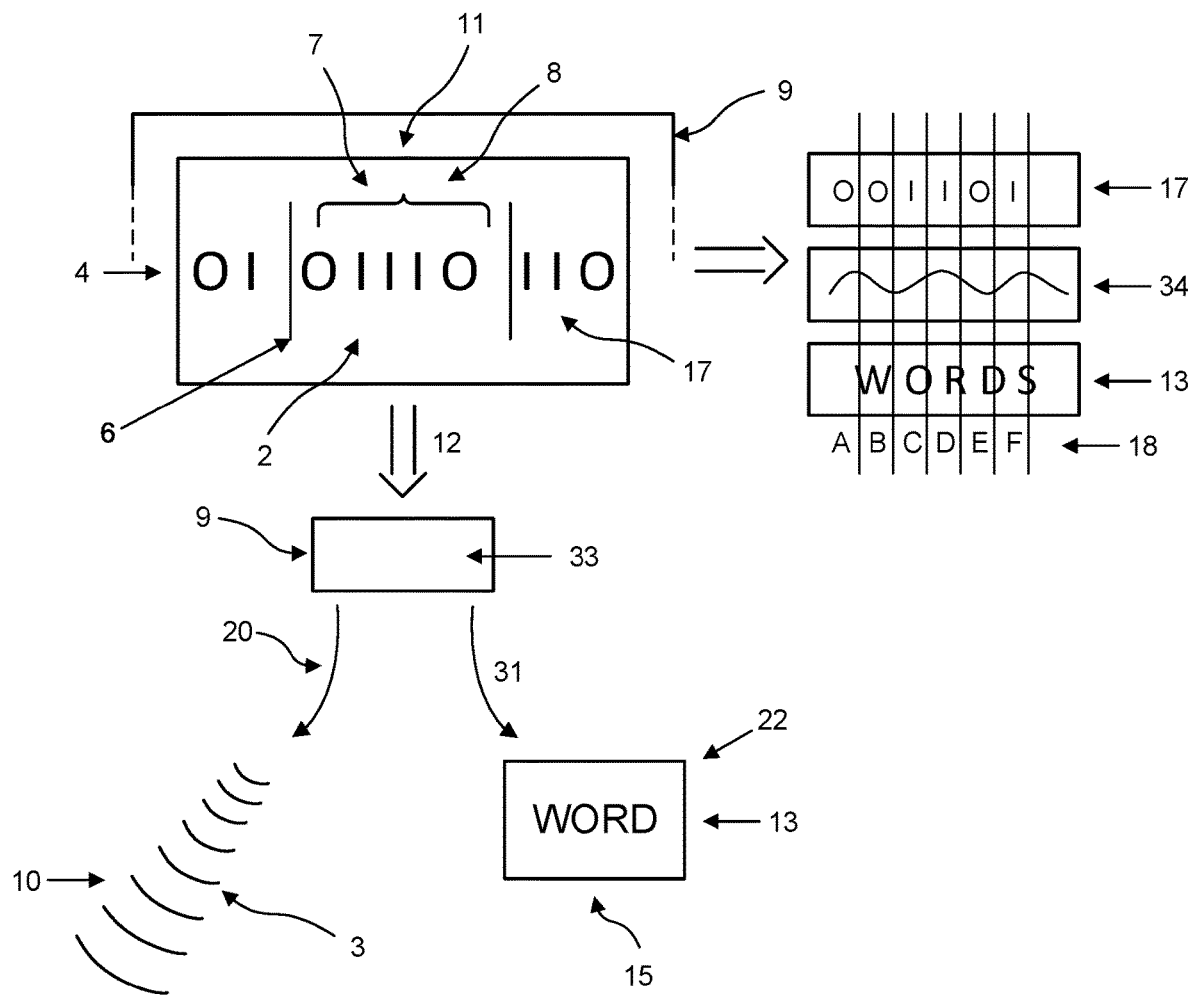
FIG. 2 is schematic view of the data that is marked by the user and stored on the computer processor device as a form and format of digital data.

FIG. 2 is schematic view of the data (4) that is marked (6) and stored (21) on the computer (9) processor (9) device as a form and format of digital (17) data (4). The user (1) identifies the length (7) and location (8) of the section (2) of the data (4) to be marked (6). The marked (6) section (2) of the audio (3) book (15), digital (17) audio (3) data (4) can be deposited into to include but not restricted to a computer (9), a processor (9), and a digital (17) buffer (9) in the form of an audio (3) file (4), digital (17) audio (3) data (4) that can be auditorily (10) played (10) or replayed (10). The marked (6) section (2) can have to include but not restricted to a mark (6), designation (6), and tag (6) such that the section (2) can be easily to include but not restricted to recalled (33), referenced, located, and found, based on the index (11). This can be stored (21) and replayed as audio (10) and as word (13) and manipulations (21) and processing 2!) and storage (21) can include can include but are not restricted to word-text to word-text, audio to audio, word to audio, audio to word-text and can include but are not restricted to single, or multiple images, pictures, words, alphanumeric symbols and other sensory and communicating media and formats and can include but is not restricted to manipulating, storing (21) and converting from digital (17) to analog (16), analog to digital as well as stored in a digital, an analog or waveform format.

Figure 3A:
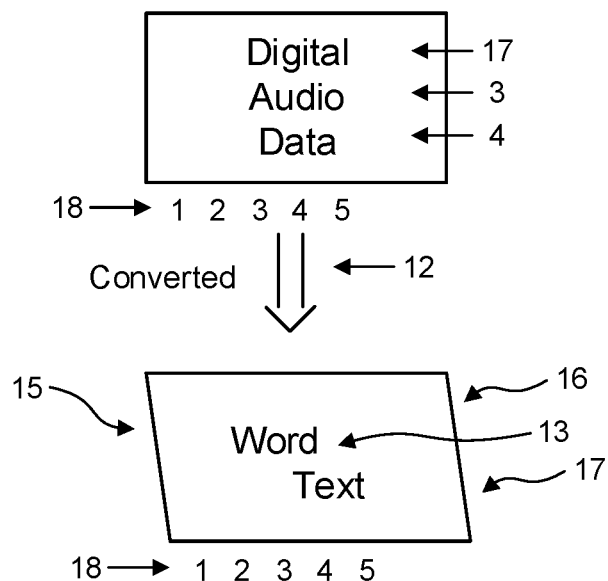
FIG. 3A is a schematic view of digital audio data that is converted to text data.

FIG. 3A is a schematic view of digital (17) audio (3) data (4) that is converted to text (13) data (4). The tagged (6), marked (6) and indexed (18) sections (2) can be converted (12) to include but not restricted to a word (13), a text (13), an alphanumeric (13), and a symbol (14) document (15) and file (4) that can be analog (16) or digital (17) or a combination of analog (16) or digital (17). The audio (3) file (4), digital (17) audio (3) data (4) can be to include but not restricted to be indexed (18), referenced (11) and located (11) to include but not restricted to match, to correlate, and to correspond to a digital (17) data (4) to include book (15), document (15), or text (13) from which it is being read (20). Once the tagged (6), marked (6) section (2) is identified its location (8) can be found in the digital (17) book (15) and the tagged (6), marked (6) section (2) of the audio (3) file (4), digital (17) audio (3) data (4) that corresponds (19) to the digital (17) word-book (13, 15) can be identified (11). This digital (17) word book (15) identification can include highlighting that section (2) of the book (15) corresponding to the initially marked (6) and tagged (6) audio (3) file (4). The said section (2) of the book (15) can then be stored in a digital (17) buffer (9), storage (9) that can be stored in an audio (3) or word or both formats (4). The digital (17) word-book (13,15) therefore when scanned will have the highlights of the audio (3) marking (6). Both the audio (3) file (4) and the digital (17) word book (13, 15) can have any combination of personalized saved tagged (6), marked (6) section (2)s that can take the form of digital (17) or audio (3) formats (4). These saved tagged (6), marked (6) sections (2) can then be organized, or saved in a form that best serves the listener (1) or at least a second listener other than the primary listener.

Figure 3B:
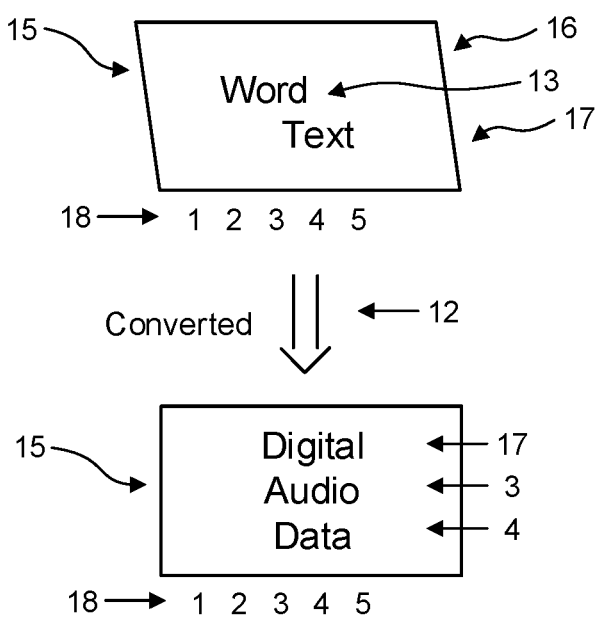
FIG. 3B is a schematic view of digital text data that is converted to audio data.

FIG. 3B is a schematic view of digital text data that is converted to audio data.

The same process can be performed where the digital (17) word book (13, 15) is marked (6) and made to correspond (19) with the audio (3) file (4). Any combination of these can be used together and can be used be used combination—the living being (1) can spend part of the time as a reader and part of the time as a listener (1).

Figure 4:
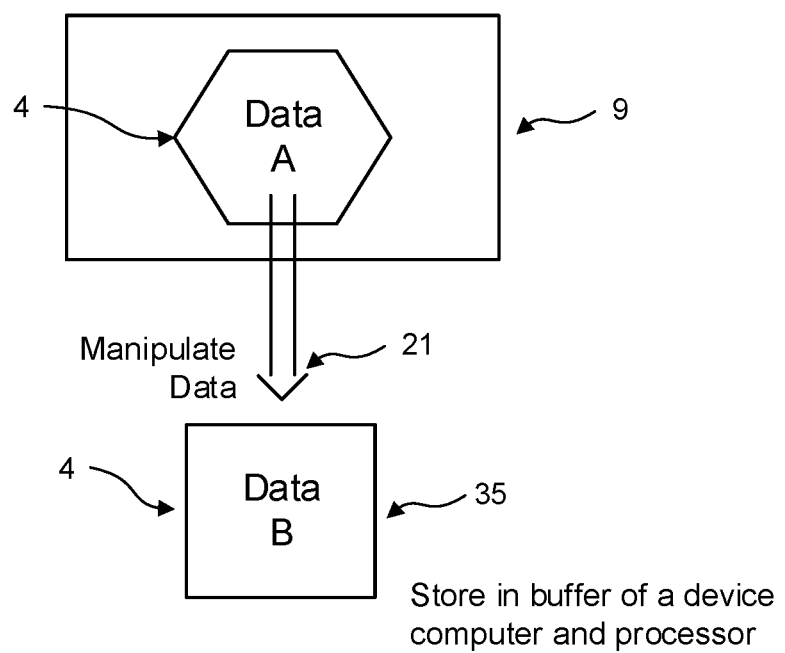
FIG. 4 is a schematic view of digital storage of marked data section in a processor and manipulation of the data.

FIG. 4 is a schematic view of digital (17) storage of marked data section in a processor (9) and manipulation (21) of the data (4). Data (4) can be stored to include long and short-term storage. Data (4) can be copied and stored in a storage component (35) of to include but not restricted to the device (22) or in a separate device (22) or the cloud or internet or any combination, which has the capacity to include but not restricted to manipulate (21), alter (21), copy (21), encode (21), output (21), input (21), capture (21), process (21), store (21), and organize (21), to include but not restricted to media (4), data (4), formats (4), and information (4). Input (29) and output (30) devices (9) can capture and release data (4) and sensory (23) and physiologic (48) to include but not restricted to data (4), actions, responses, reactions and feedbacks to the user (1) and to devices (9).

Figure 5:
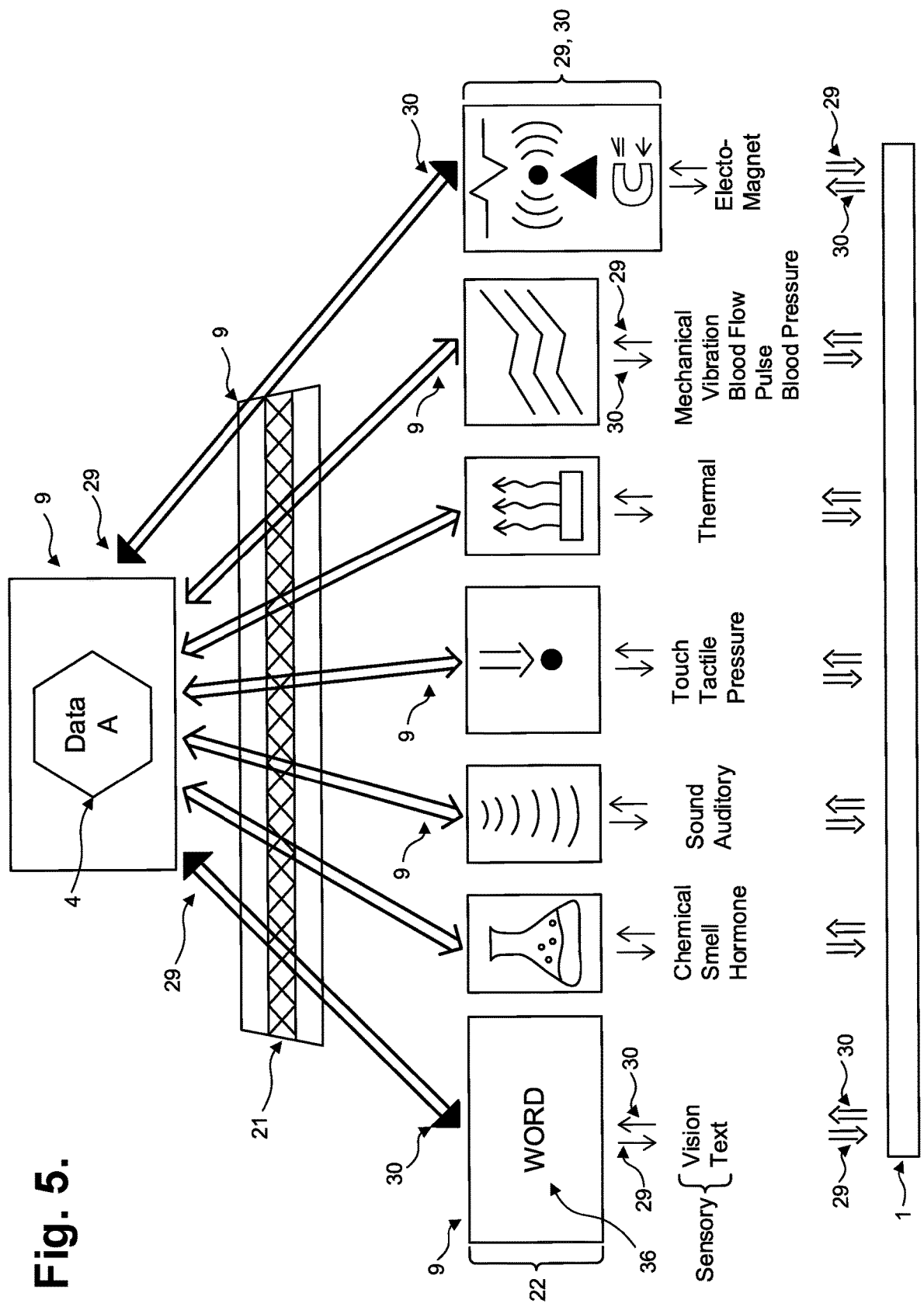
FIG. 5 is a schematic view of the manipulation and variation of the data to correspond to interact with the user's senses.

FIG. 5 is a schematic view of the manipulation (21) and variation of the data to correspond to interact with the user's senses. (23) that can be to include but not restricted to input to (29) and output from (30) a machine or device (9) and a human user (1) and the data (4) can be manipulated (21) and altered (21) by to include but not restricted to device (9), computer (9), and processor (9) hardware or software or any combination or variant of these. The manipulation (21) and alteration (21) can include but not restricted to visual (49), acoustical (10), or by other sensory (23) and physiologic (48) manipulations (21), inputs (29) and outputs (30). Inputs (29) and outputs (30) can include but are not restricted to being input (29) or output (30) to a given user (1) and Device (9) and can be similar or different depending upon whether the inputs (29) and outputs (30) are to be inputted or outputted a to include but not restricted to a device (9) and machine (9) and a human user (1) and these inputs (29) and outputs (30) can flow in both directions and can to include but not restricted to stimulate, excite, provide information and data (4), capture (29) and release (30) the appropriate inputs (29) and outputs (30) signals dependent on whether that signal is to or from a user (1) or a device (9) and the inputs (29) and outputs (30) can to include but are not restricted to excite, stimulate, speed-up, inhibit, suppress, slow-down, start, stop, manipulate, and feedback a function and an operation or a user (1) and a device (9) and any combination thereof.

The calculating (21) processing (21), manipulation (21), altering (21) of data (4) can include highlighting (36), removing a section (2) for later separate viewing, changing size or relativistic perspective of the data (4) compared to the other data (4) and sensory (23) elements and data (4) to include but not restricted to making it larger or smaller, brighter or less bright, louder or softer, of different pitch, of different frequency, different speed, of different tone, timber, or tenor, of a different instrument or accompanying instrument, of different pacing, of different background, of different color, of different font, and of different outline and underline. A component of the device (22) can generate a sensory (23) signal to include but not restricted to a in to include but not restricted to sensory elements (23) to include but not restricted to change in a thermal hot or less hot or cold quality; change in a tactile element to include but not restricted to pain, vibration, pressure, proprioception, soft or hard touch; change in olfaction or smell or nasal or oral mucosal or skin receptors or stimulants by the release of to include but not restricted chemical substances (24) to include but not restricted to oxytocin, dopamine, or other organic neurochemicals, hormones or amino acid and peptide chains and biologically active chemicals or organic or inorganically active chemicals and compounds; change in taste or gustatory stimulants; and generate to include but not restricted to a magnetic signal (25), an electrical signal (25), an electromagnetic (25) signal and chemical (24) signal and mechanical elements and forces (26) to be delivered to the living body (1).

Figure 6:
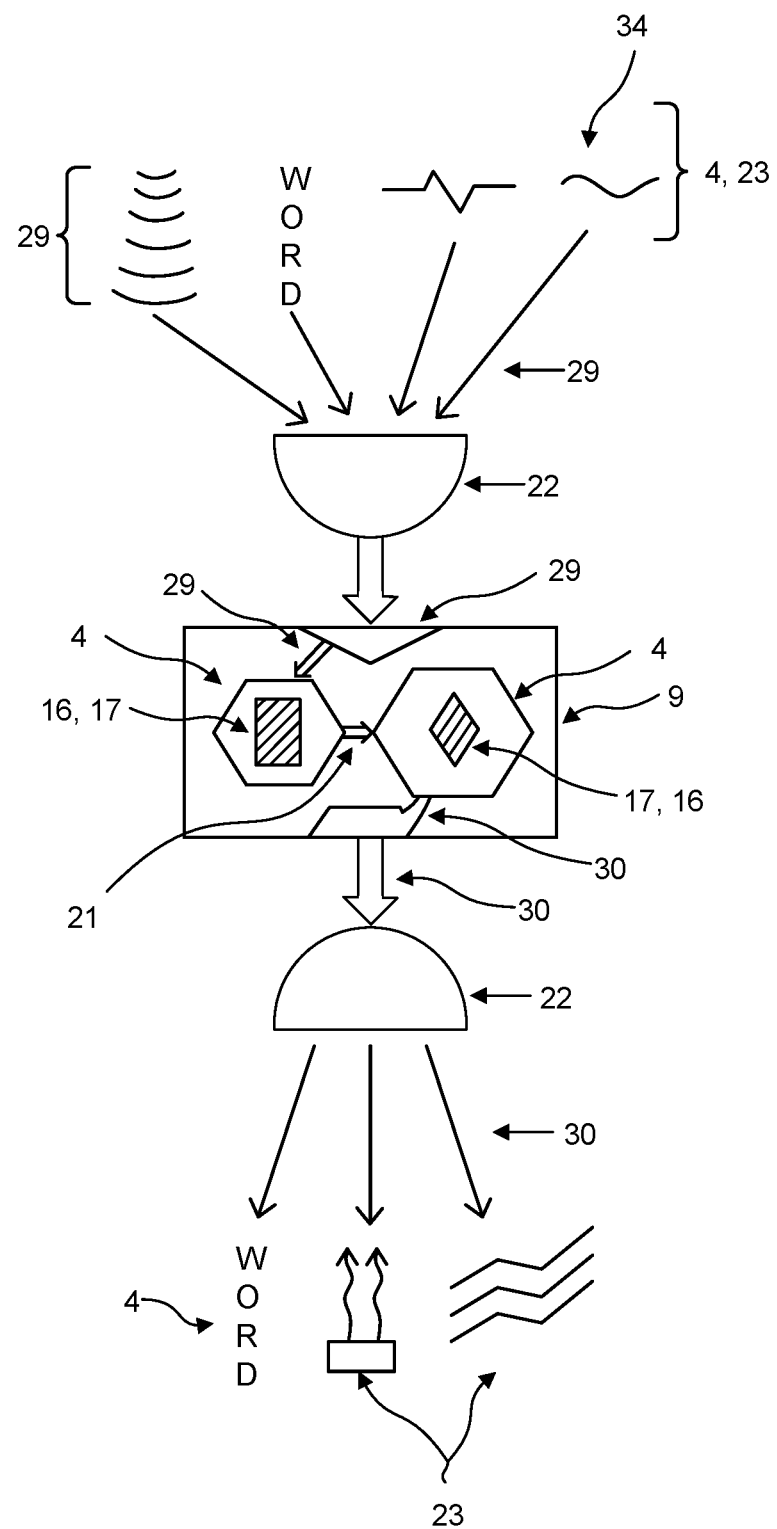
FIG. 6 is a frontal view of computer, device and human inputs, processors, and outputs all of which can interact and communicate.

FIG. 6 is a frontal view of a device (9) that can include but is not restricted to a computer, processors, with inputs (29) and outputs (30) that can be utilized by a device (9) and a user (1), all of which can interact and communicate. Computer (9) or computers (9), hardware (9), processors (9), computer (9) and digital (17) buffers (9), digital storage (9) and software (9) and combinations and admixtures of these can be utilized to include but not restricted to being for synchronizing, personalizing and optimizing a unique individualized system that fits the encoding and processing of media (4), data (4), formats (4), and information. Computer (9) or computers (9), hardware (9), computer (9) digital (17) buffer (9), and software and combinations and admixtures of these can be utilized to include but not restricted to being for manipulating and altering the data (4), information and media (4), to include but not restricted to outputs, inputs, capture, processes, stores, organizes media (4), data (4), formats (4), and can include but is not restricted to the ability to customize information from individual to individual in a personalized individualized manner across different media (4), data (4), or information formats (4).

Data (4), information and media (4) can be inputted captured, and outputted in the form of known sensory (23) inputting, capturing, and outputting devices (22) to include but not restricted to audio (3) transmitters and receivers, speakers, microphone, visual capture and sensing and capture transmission devices (22), cameras, displays, tactile input, capture, and output devices (22) and sensors for temperature, pressure, pain, light and hard touch, proprioception, movement, gestures, output and display and assessment and capture, olfactory and gustatory and taste input, capture and output of chemicals and hormones and peptides and biological compounds that be detected by human and non-human sensory (23) mechanisms, organs and devices (22).

Analog (16) and digital (17) inputs, captures, and outputs can include but are not restricted to be used together, conjointly, synchronously, simultaneously, separately, side-by-side, overlapped and mutually acquired or displayed.

Figure 7:
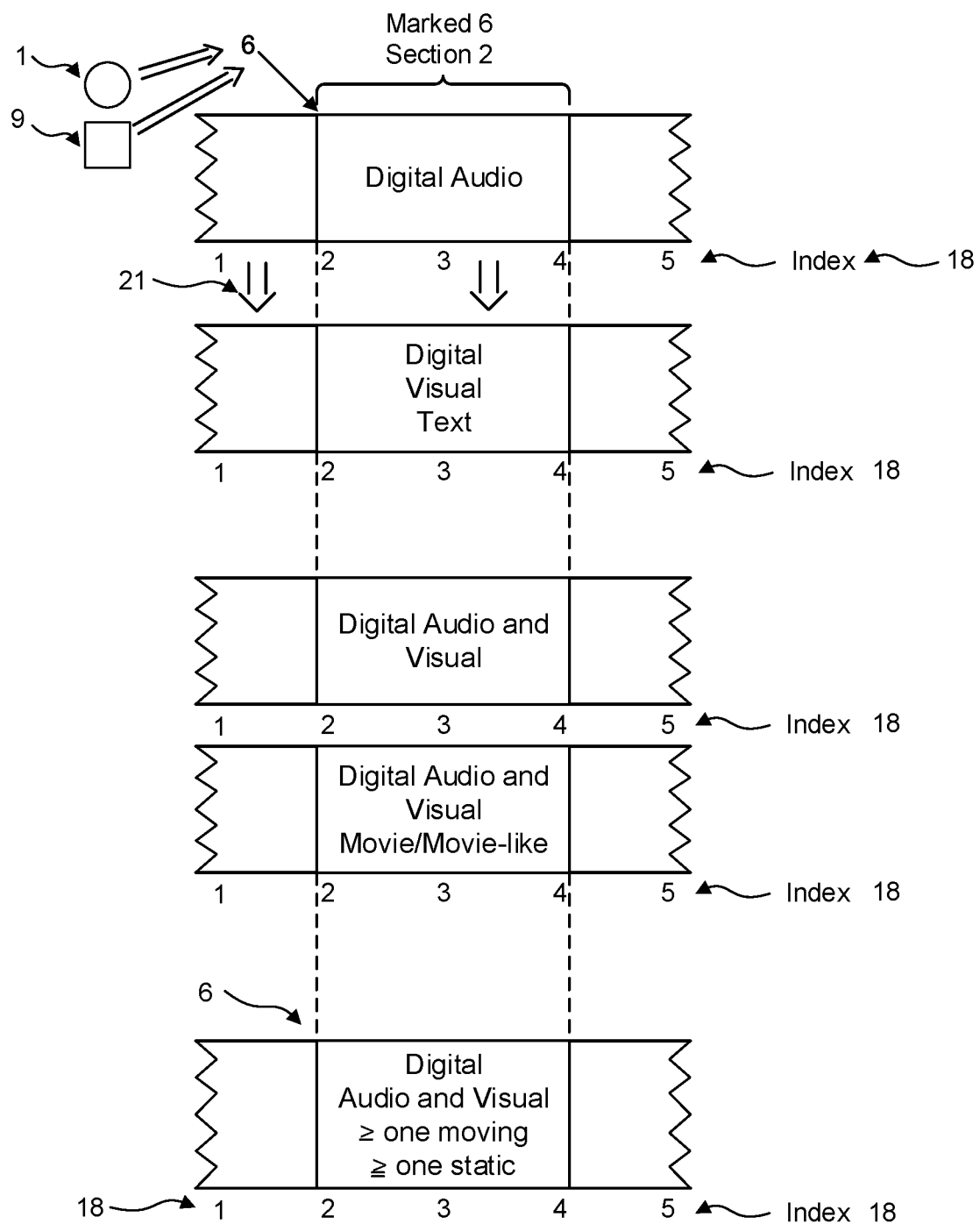
FIG. 7 is a schematic view of a section of personalized section of data that has been marked by the user with a section of the first referenced data that is uniquely marked and indexed digital data which can be compared and correlated to a second section of uniquely referenced and formatted and digital data from a first or from a second referenced data set.

FIG. 7 is a schematic view of a section (2) of personalized section (2) of data (4) that has been marked (6) by to include but not restricted to a user (1) a processor, (9) and a combination of both and with a section of the first referenced data that is uniquely marked (6) and indexed (18) digital (17) data (4) which can be compared and correlated to a second section of uniquely referenced and formatted and digital data from a first or from a second referenced data set.

All formats (4) of media (4), information, and data (4) are indexed (18) to precisely match (19) each other form of media (4), information, and data (4). The User (1) marks a section (2) of one or more than one of the media (4)/data (4) formats (4) section (2) to be identified as personalized. In this embodiment personalized is used to mean desired to be recognized as unique for that User (1). The marked (6) section (2) can be uniquely manipulated (21) and altered (21) on the original data (4) or can be copied and stored in a component of a device (22) designed for storage and input, capture, process, and output of data (4). The section (2)s of data (4) for any and all formats (4) will be to include but not restricted to be marked (6), copied, stored and can be outputted. Indexing of data can include at least one or more than one form of indexes and indexing. In the preferred embodiment the format of indexing can be similar, universal.

Figure 8:
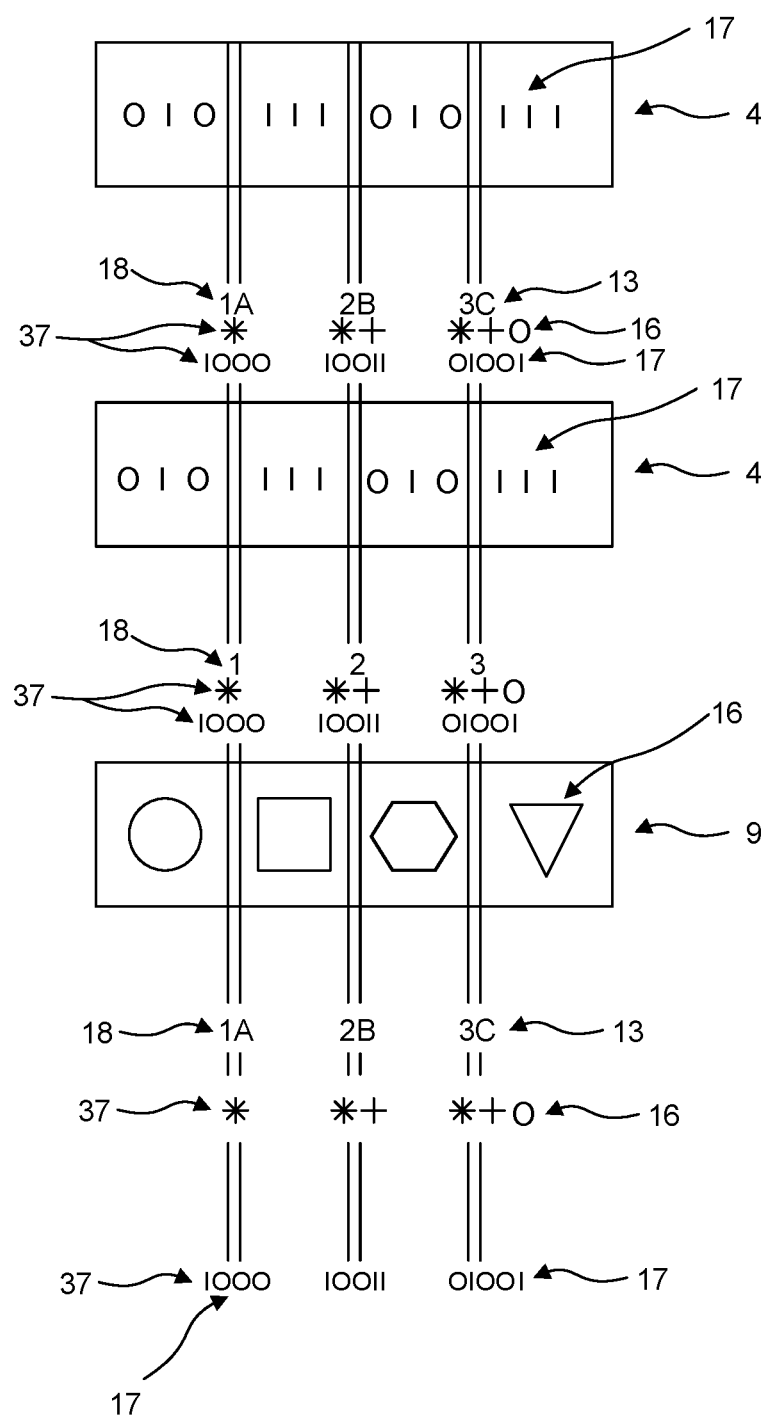
FIG. 8 is a schematic view of a section of indexed data from one source that is compared to a section of another source of indexed data with a different form of indexing in which both can be compared and correlated through a universal translator index.

FIG. 8 is a schematic view of a section (2) of indexed (18) data (4) from one source that is compared to a section (2) of another source of indexed (18) data (4) with a similar and a different form of indexing (18) in which both can be compared and correlated through a universal translator index (37). In one embodiment the methods of indexing (18) can differ in form and style and include more than one unique forms of indexing (18) than a to include a standardized and a non-standardized universal translator format (37) can exist to translate and correlate (19) and compare (19) one form of data (4) to another form of data (4). If there is a universal translator (37) index (18) than each format (4) or media (4) can have a unique means or method of formatting (4) which can then be formatted by the universal translator (37) indexing (18) method or means and the indexing (18) can include but is not restricted to a format and signature that can include but is not restricted to a digital (17) format or to include but not restricted to non-digital formats (38) to include but not restricted to an analog (16) and a wave, wavelength, (34), an electromagnetic (25), a valanced, a, kinetic to include but not restricted to a kinetic, vibration, ultrasound, tactile, mechanical (26), and chemical (24) system, or any combination of these.

Indexing in the preferred embodiment can include but is not restricted to a form of digital (17) indexing and identification of each element or segment of the media (4) and assignment of an index (18) value and location to that data (4). Data (4) and information prescribed to that data (4) in a standardized manner for one format of data (4) such that it related and correlates with a second form of data (4) or format. Other indexing methods can include but is not restricted to assigning to the data (4) an index (18) of the data (4) prior to, during or after the usage of the data (4) by the User (1), pattern recognition of the data (4) by digital (17) or analog (16) pattern matching, optical character reader (OCR) and audio (3) wave identifier and reader, and any combination of these. The preferred embodiment is wherein the indexing (18) is a form of digital (17) indexing (18). A to include but not restricted to include but not restricted to a similar and an analogous process can be applied to digital (17) data, analog (16) data (4) and a combination of both and can apply and be created for personalized data as well as referenced and standard data (4). An index (18) format or form can be a digital (17) format, an analog (16) format and a combination of both and these formats and forms can also include but are not restricted to alphanumeric (13) and symbolic, audio, chemical, electromagnetic, thermal, and mechanical data and energy forms and formats.

FIGS. 9A-E are frontal views of user representative methods for a user to mark a section of data.

In the preferred embodiments marking (6) can be performed to include but not restricted to by the user (1) and by a processor (9) and a device (9) to include but not restricted to a sensory, a visual (49) wave and wavelength, (34), an electromagnetic (25), a valanced, a to include but not restricted to a kinetic, vibration, ultrasound, tactile mechanical (26), and chemical (24) systems, or any combination of these. embodiments of marking (6) to include but not restricted to means and actions that can include but not restricted to interfaces to include but not restricted to interfaces between human users (1), devices (9) and any combination of these and which can include but are not restricted to digital (17) and analog (16) and any combination of these. One embodiment of marking (6), designating, tagging, and manipulating (21), processing, and organizing data can include but not is restricted to means and actions that can include but are not restricted a sensory (23) and a mechanical (26), a biological, a physiological (48), and a sensory (23) process to include but is not restricted to acoustic and tactile actions and commands, which can include but are not restricted to speaking or creating to include to include but not restricted to designated sound, an acoustic (10) command and an audible (10) noise that can include but is not restricted to being produced by a human (1), an instrument, a machine and a computer (9).

Figure 9A:
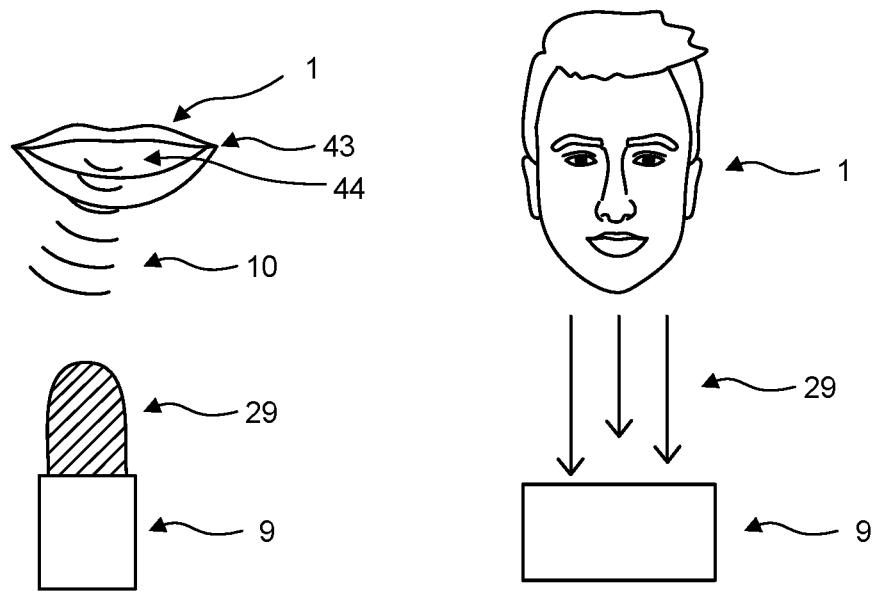
FIGS. 9A-E are frontal views of user representative methods for a user to mark a section of data.

In FIG. 9A these actions can involve the human vocal and sound (10) apparatus (44) or a mechanical apparatus and sound (10) and noises (10) to include but not restricted to interfaces to include but not restricted to interfaces between human users (1), devices (9) and any combination of these and which can include but are not restricted to digital and analog and any combination of these and which can include clicks, snaps, and rubbing that can initiate a trigger (45) and set about actions (46) and commands (46).

Figure 9B:
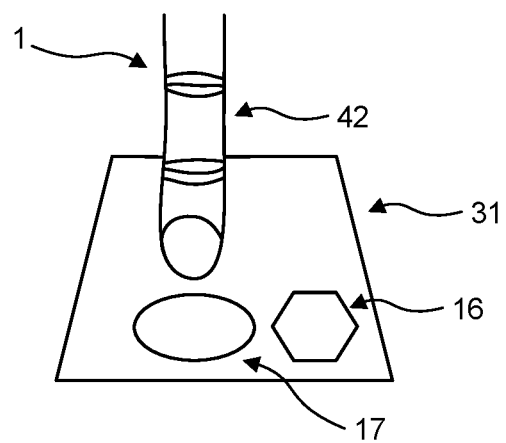

In FIG. 9B another embodiment can include action and commands that can include but are not restricted to include a tactile motion or command to include but not restricted to mechanical action (26) to include but not restricted to moving, tactile (47), and touching (47) mechanism to include but not restricted to be acted upon a digital (17) and analog (16) to include interfaces, displays (31), buttons (39), levers, touchpads, pedals, switches and sensors that can include but is not restricted to responding to temperature, pressure, pain, light and hard touch, proprioception, movement, gestures, visual cues and signs and prompts and signals and other human and machine and computer (9) sensitive sensory (23) signals that can include but are not restricted to sensory (23) sensors that can include but are not restricted to input (29) and output (30) transmitting (30) and receiving (29) devices (9) and which can include but are not restricted to wearables (40). Another embodiment can include an input (29) capture device that can include but is not restricted to a camera or a camera-like visual (49) device (9).

Figure 9C:
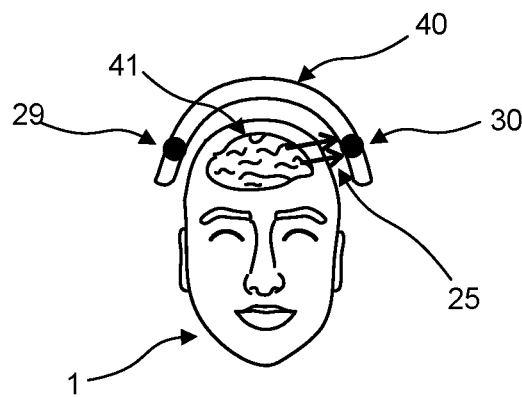

FIG. 9C is another embodiment which can include wearables, which that can include but are not restricted to input (29) and output (30) transmitting (30) and receiving (29) devices that can receive electromagnetic energy (25) Electroencephalographic detectable energy: EEG (25), and signals from to include a user's (1) body part to include but not restricted to the user's (1) brain (41), head, and muscle and the wearables (40) can include but are not restricted to caps, clothing, headphones and hats.

Figure 9D:
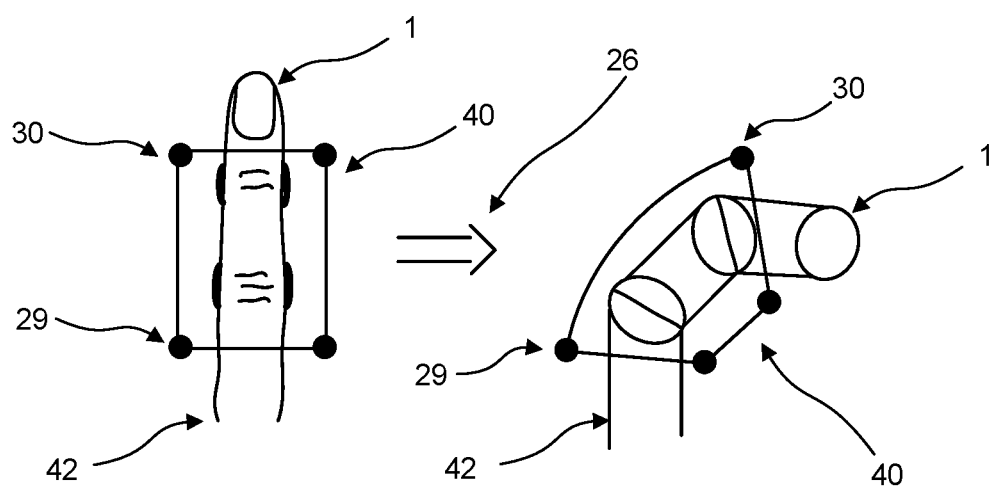

FIG. 9D is another embodiment which can include wearables (40), which that can include but are not restricted to input (29) and output (30) transmitting (30) and receiving (29) sensing devices that can include but are not restricted to electrodes and sensing input (29) and output (30) transmitting (30) and receiving (29) devices can detect kinetic and mechanical motion and the wearable (40) can include but are not restricted to bands (42), and gloves that can detect to include but not restricted to a mechanical (26) action or energy to include but not restricted to motion, pressure, temperature and flow to include but not restricted to blood flow and can be place on any part of the user's (1) body to include but not restricted to the skin and mucosa and can be related to but not restricted to muscles, joints, fingers (42), regions of the blood vessels the face and the related organs to include but not restricted to the mouth and jaw, the eyes, the ears, the nose and skull.

Figure 9E:
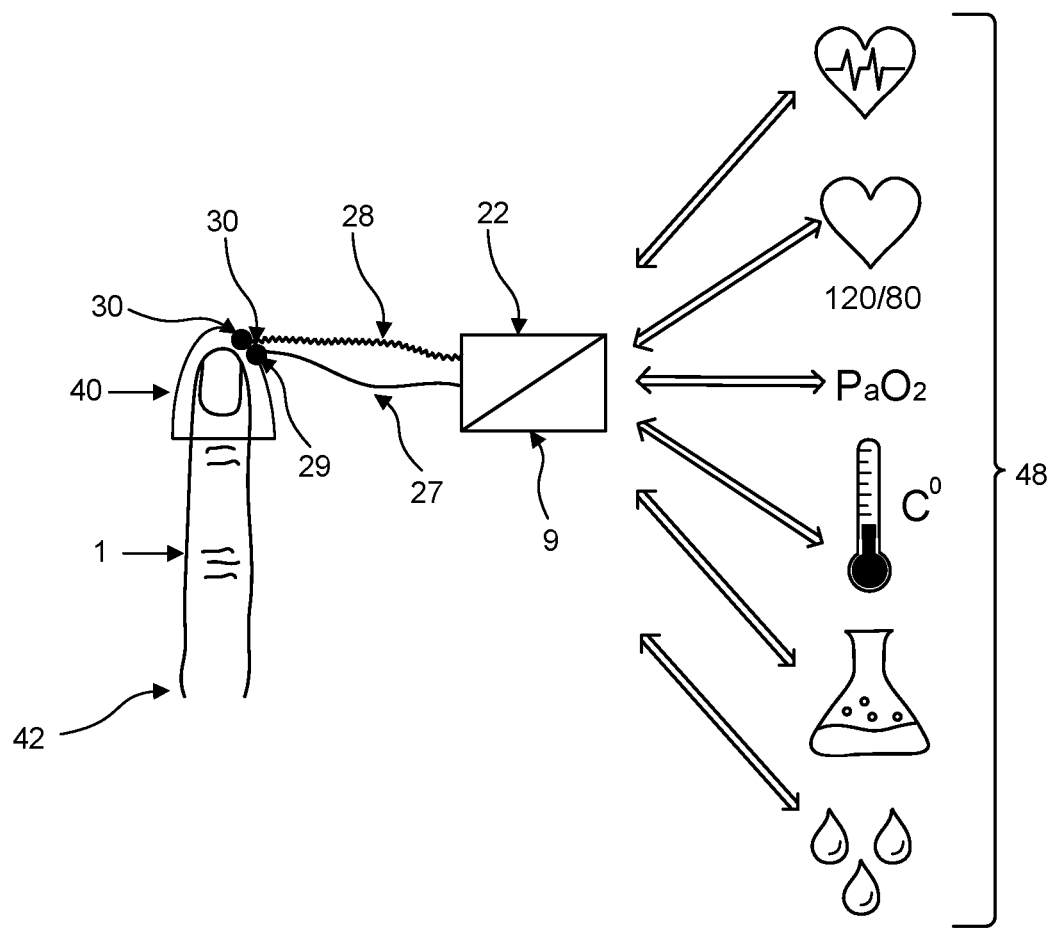

FIG. 9E is another embodiment which can include wearables (40), which that can include but are not restricted to input (29) and output (30) transmitting (30) and receiving (29) sensing devices that can include but are not restricted to electrodes and sensing input (29) and output (30) transmitting (30) and receiving (29) devices can detect kinetic and mechanical motion and the wearable (40) can include but are not restricted to bands (42), and gloves that can detect to include but not restricted to a mechanical (26) action or energy to include but not restricted to motion, pressure, temperature and flow to include but not restricted to blood flow and can be place on any part of the user's (1) body to include but not restricted to the skin and mucosa and can be related to but not restricted to muscles, joints, fingers (42), regions of the blood vessels the face and the related organs to include but not restricted to the mouth and jaw, the eyes, the ears, the nose and skull. And in this embodiment the user's body part can include but is not restricted to the finger (42) of the user (10) and a sensory (23) input (29) and output (30) can include a wearable that can utilize a wireless (28) and a wired connection to include but not restricted to a wire, an optical cable and a non-wireless cable (27) to connect to a device (22) that can include but is not restricted to having but not restricted to a gauge, a measuring device, a sensing device (23) and can include but is not restricted to having a computer and processor (9) and the device can assess signals from a human that can include but are not restricted to electrical, magnetic, electromagnetic, chemical. thermal, mechanical, flow, pulse, blood flow, blood pressure, gas saturations to include but not restricted to oxygen, carbon dioxide and nitrogen, air movement, sound, vibration, sweat, wetness and dryness, hormones, chemicals, changes in temperature, and pressure and can include but are not restricted to the signals of other senses to include but not restricted to sensory, neural, and the bodies processes and functions which can be used as a signal.

Figure 10:
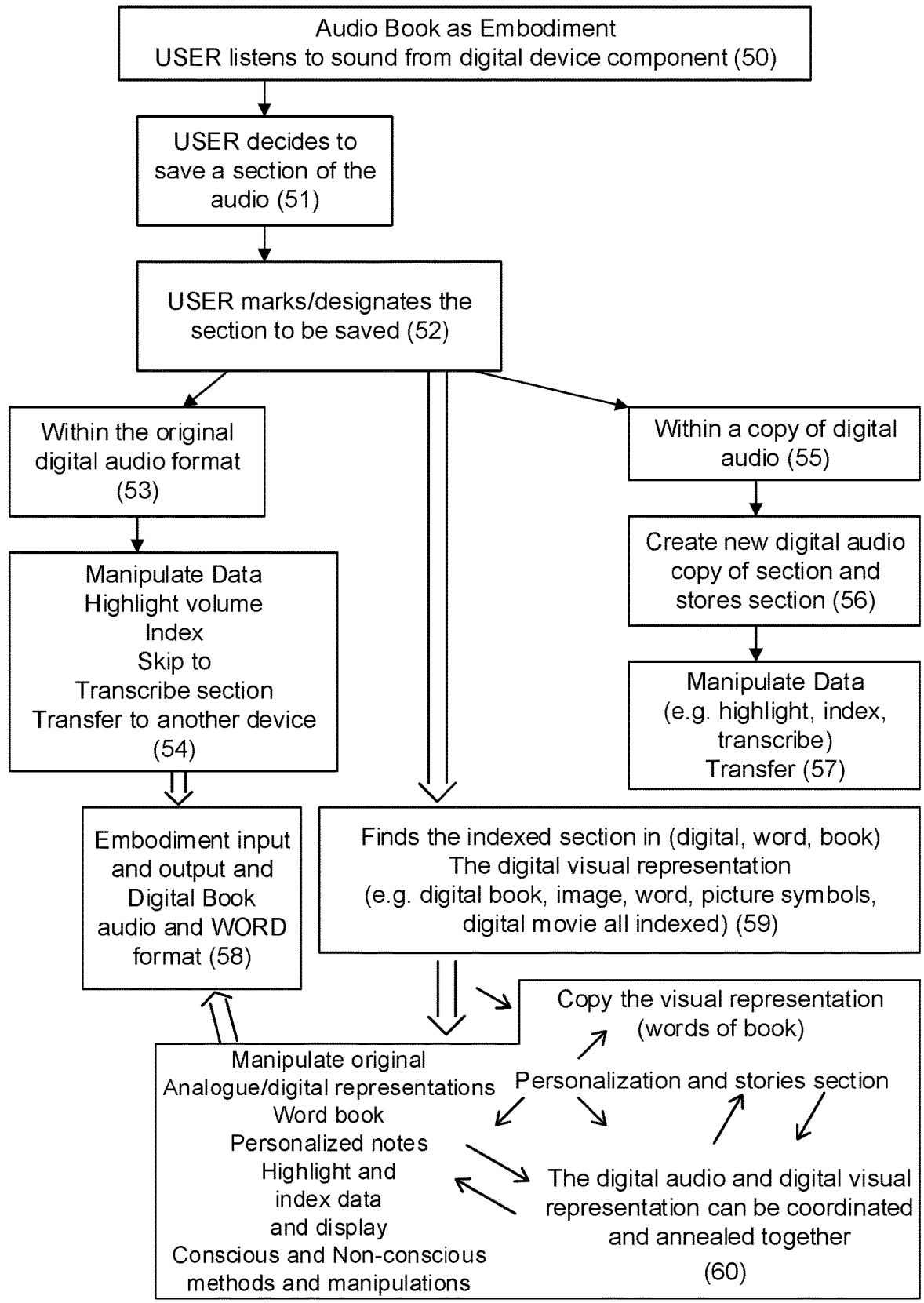
FIG. 10 is a schematic flow chart of an embodiment of representative processes that can be performed on marked data.

FIG. 10 is a schematic flow chart of an embodiment of representative processes and operations that can be performed on marked data. Operation 50 includes a digital (17) data (4) embodiment in which the User (1) can listen to a digital (17) data (4) audio (3) book (15). In Operation 51 the User (1) finds a section (2) of interest the User (1) marks that section (2) for to include but not restricted to storage, copying, retrieval, recall and review. The device (22) and its program recognize the data (4) section (2) assigned for personalization. In Operation 52, the device (22) and the program identify the marking (6) of the audio (3) book (15) and determine the pre-indexed identification and location (8) of the audio (3) data (4). The indexed audio (3) data (4) segment location (8) is then compared to the pre-indexed digital (17) data (4) wordbook (15), the segments of the digital (17) audio (3) and word book (15) are matched to the best fit correlation to the similar, near similar, or identical segments of the wordbook (15) based on the wordbooks (15) pre-indexed and correlating section (2) that matches the index (18) of the audio (3) book (15). These segments can then be identified and include but are not restricted to being highlighted within the original data (4), or copied within the original data (4) set or in a new data (4) set or a combination of both. The data (4) can be stored. The data (4) can be displayed in an analog (16) manner retrievable to the human senses. The data (4) can be stored for immediate or future reference in a visual or auditory (10) manner or a combination of both.

In one embodiment, Operation 53 the data can be contained within the user's device and in Operation 54 that data can be manipulated to include but not restricted to being highlighted, individualized, sections can be skipped and the personalized notes can be to printed and transcribed and transferred to another device. In Operation 58 the personalized section of the audio book is transferred into a digital book word format and an audio format that and the data, information and media can be to include but not restricted to be displayed, played and produce and receive sensory inputs and outputs and to include but not restricted to allow the input and output of data, information, and media to be shared to include but not restricted to at least one of a first user and at least one second user or a combination of these.

In another embodiment, in Operation 55 the selected data section can include but is not restricted to be transferred, sent, and copied to another to a storage unit and device to include but not restricted to a digital device, a processor, a computer and a cloud storage and any combination of these. And in Operation 56 that data section can be to include stored, buffered, and copied in the selected data storage unit. In Operation 57 that data can be manipulated to include but not restricted to being highlighted, individualized, sections can be skipped and the personalized notes can be to printed and transcribed and transferred to another device. In Operations 50 to 57 the data can include but is not restricted to be non-indexed, indexed, and universally indexed and any combination of these.

In one embodiment, Operation 59, the data presented, the data referenced and compared to other sources is indexed. The data is stored and manipulated in a storage device that contains to include but not restricted to multiple data formats, information, and media formats. In Operation 60 is the personalization of the data. In one embodiment the user's sectioned of the data is manipulated and can include but is not restricted to multiple manipulations and operation to include but not restricted copying the data to other devices, storage and digital and analog manipulating tools, annealing and combining different data and media formats, converting data, information, and media formats, editing data and personalized notes, having computers, processors and devices assist in the manipulation and editing of data, information and media, highlighting data, indexing data, information and media, transferring the personalized data, information and media to another device that can be a first and a second user's device and the personalized section of the data, information and media can be to include but not restricted to be displayed, played and produce and receive sensory inputs and outputs and to include but not restricted to allow the input and output of data, information, and media to be shared to include but not restricted to at least one of a first user and at least one second user or a combination of these.

Data can be organized, manipulated, and catalogued to include but not restricted to by conscious and non-conscious to include but not restricted to means, modalities, methodologies and manipulations.

The data (4) can be used to include but not restricted to being used for pleasure, leaning, research, entertainment, personal-recall, and developing strategies for dealing with and treating and overcoming a personal, medical or innate or acquired pattern of character, body and brain structure or processing or a disability and for enhancing a personal pattern of character, body and brain structure positive or negative or neutral human impediment or asset. The device (22) and programs can manipulate (21) and alter (21) the data (4) by the User (1) to optimize the User's (1) experience.

In another embodiment, after the audio (3) book (15) is completed the User (1) will have, an audio (3) format, a word format, and a combination of an audio (3) and word personalized outline of the most personalized and salient aspects to the data (4). In another embodiment the personalized format can be used for research and learning to quickly identify those portions of the book (15) that were most interesting and informative to the User (1) and the User (1) can share this data (4) with others and others can modify and manipulate (21) and alter (21) the data (4) to meet the more than one or the second User (1) s personalized needs. These modifications can be used in to include but not restricted schools, medical facilities, academics, Internet-sharing, industry and book (15) clubs. Rather than rereading or re-listening to an entire book (15) the User (1) can re-listen and can re-read (20) the sections (2) most personalized to the first as well as to other Users (1).

FIG. 11 is a schematic flow chart of an embodiment of representative formats and their comparison and conversion to similar and different data media formats. Operation 61 includes conversion of auditory to visual which can include but is not restricted to text, words, symbols and pictures. Operation 62 includes visual to auditory. Operation 62 includes visual to auditory. Operation 63 includes visual-auditory to visual and auditory. Operation 64 includes auditory to auditory which can include but is not restricted to different languages and dialects. Operation 65 includes visual to visual which can include but is not restricted to correction of color blindness, color and black and white, and black and white to color, text from a first language to at least one of a second language, and a moving picture to a still picture. Operation 66 includes the incorporation of additional sensory information to the visual and auditory can include but are not restricted to olfactory, smell, gustatory, taste, and tactile senses and pain, light touch, thermal, baroawareness, firm touch, proprioception, motion detection, dry and wet, vibration, and combinations of human senses and awarenesses.

Embodiments can depicts the ability of the invention to include but not restricted to the program, algorithm, device (22) and method as the first interface of the invention with the human as being to include but not restricted to audio (3) data (4), visual data (4), sensory (23) data (4) and any combination of these. As an exemplary embodiment the first data (4) can include but in not restricted to being audio (3) book (15), a visual word or symbol (14) or pictorial (14) book (15), a movie (4) or moving picture, a podcast (4), a video (4), a series of senses (23) that convey a message or communicate a thought, emotion, feeling, intention, or interactions with to include but not restricted to the User (1), a self being human, other humans, plants, animals, nature, instruments, and computers (9). In another embodiment the invention can include but not restricted to an IDES system that can be utilized to include but not restricted to audio (3)-to-audio (3) formats (4) to include bit not restricted to different languages and a format having the words sung rather than be spoke as might be useful for a dyslexic or disabled individual; visual to visual formats (4) to include but not restricted to different languages, and a format where the colors can be manipulated (21) by a computer (9) or by an individual or both and that can adjust to be more pleasant or can be utilized for color blind individuals.

Figure 12:
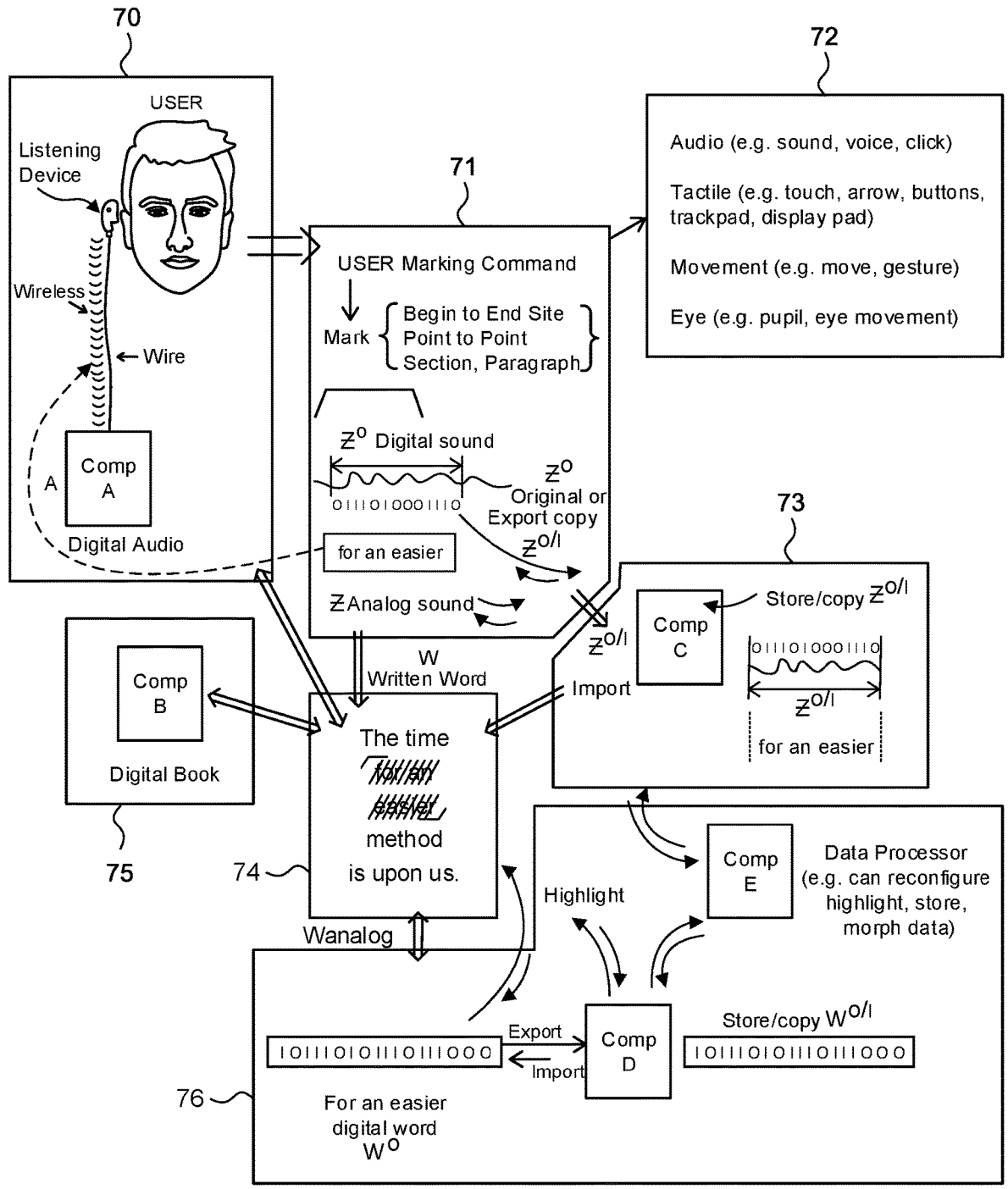
FIG. 12 is a schematic flow chart of an embodiment in which multiple elements of the invention are combined together.

FIG. 12 is a schematic flow chart of an embodiment in which multiple elements of the invention are combined together. In Operation 70 the user can interact with an information device, that can include but is not restricted to a display, and input and output, a transmit and receive element, a computer, processor and a device with any combination of these. The user in this embodiment is listening to a digital audio data and sounds via a wired or wireless listening device. The user can speak into the device which has an audio-receiving unit such as an internal microphone such as an earbud or ear phones or from a speaker in the device. In Operation 71 the user marks a section of the data that the user wishes to save, manipulate, personalize, interact with, and store for future use. The stored section can be saved in a digital storage device, which can be a computer, processor and which can contain a digital storage buffer such as a component of a computer and processor, which can hold temporary or long-term data. The data is indexed in the form of a digital, wave and an analog index. IN the preferred embodiment the indexing is digital and the digital index is capable of interacting with other devices with similar indexing. In one embodiment the indexing can be a universal index. In Operation 72 the marking can include but is not restricted to an audio marking such as speech, a tactile marking such as touching a screen with to include but not restricted to an arrow, a button, a trackpad and a display pad, a kinetic or mechanical movement to include but not restricted to a gesture and detection of movement of a part of the body, and an optical, ocular or visual process such as a movement of the pupil and orbital motion. In Operation 73 the data can be stored in a device that is a device separate from the user's device to include the cloud, a computer, a processor and device that is capable of to include but not restricted to at least one of storing, copying and manipulating, translating, and converting data from one format to another format such as in this example converting audio data to word, text and image data and these forms of data have been personalized, marked, and indexed data and this data can include references and data that can be digital and analog and can be indexed and can be retrieved and located to enhance the personalization, personal experience, integration, learning, and research of data. In Operation 74 the digital data can be displayed on a display, screen, and imaging device. In Operation 75 the display can be a component of a device other than the first user device in Operation 70 or it can in Operation 75 be a component of at least a second device that is not the first user device. Operation 76 can include but is not restricted to one or more than one computer, processor, the cloud, and digital storage and digital manipulation to include but not restricted to processes of handling, converting formats and media, computing, displaying, managing, using, directing, highlighting, annealing, morphing, reconfiguring, storing, indexing, re-indexing, translating, importing, inputting, receiving, transmitting, exporting, outputting, and performing operations on the data.

The examples, specific terms, and embodiments of the methods and devices discussed herein are meant to be representative and are not meant to be restricted or limited to these examples, specific terms, and embodiments.

While the invention has been particularly shown and described as referenced to the embodiments thereof, those skilled in the art will understand that the foregoing and other changes in form and detail may be made therein without departing from the spirit and scope.

What is claimed is:

1. A system, comprising:
   a storage device interfaced to a computer processor and configured to store recorded data capable of being consciously experienced by a living user through a sensory form comprising at least one of vision, sound, smell, taste, and tactile as an indexed sequence;
   a capture device interfaced to the computer processor and with the living user and configured to capture and send electrical neural signals associated with the living user;
   an output device interfaced to the computer processor and configured to present the recorded data;
   a computer processor configured to:
      provide the recorded data to the living user via the output device that is both operatively coupled to the storage device and capable of reproducing the recorded data in the sensory form while the living user is being monitored with the capture device for a plurality of points in the indexed sequence at which the electrical neural signals as evoked by the living user in reaction to the providing of the recorded data, are captured by the capture device;
      pair the captured electrical neural signals with portions of the recorded data corresponding to the plurality of points at which the captured electrical neural signals were evoked and reorganize the recorded data in the storage device as categorized by the captured electrical neural signals;
      measure and process the captured electrical neural signals to identify one or more physiologic responses that fall below the levels of self-awareness and cognitive awareness; and
      inform the living user of the one or more physiologic responses by providing the reorganized recorded data via the output device as personalized to the user's one or more physiologic responses.

2. A system in accordance with claim 1, further comprising:
   the capture device comprising an electrical neural signal detector configured to capture the electrical neural signals.

3. A system in accordance with claim 2, wherein the electrical neural signals comprise at least one of the brain with the brain's network of nerve and neural tissue signals.

4. A system in accordance with claim 3, wherein the brain with the brain's network of nerve and neural tissue signals comprise at least one of brain neural sympathomimetic, para sympathomimetic, afferent, efferent, sensory, motor, reflex, autonomic, axonal, neural transmitter and receiver, body neural and electromagnetic signals.

5. A system in accordance with claim 3, wherein the electrical neural signals can be at least one of captured, measured, analyzed and monitored and comprise at least one of electroencephalographic and electromyographic signals, signals sensed via at least one electrode, electrical sensing signals, axonal sensing signals, valence sensing signals, galvanic sensing signals, and magnetic resonance signals.

6. A system in accordance with claim 2, wherein the electrical neural signals comprise electromagnetic signals.

7. A system in accordance with claim 2, further comprising:
   the monitor comprising one or more electrical neural signal sensors configured for electrical signal sensing and through which the electrical neural signals are captured.

8. A system in accordance with claim 7, wherein one or more of the electrical neural signal sensors comprise one or more electrodes.

9. A system in accordance with claim 2, wherein the capture device comprises one or more electrical neural signal sensors configured for positioning upon a body part of the living user.

10. A system in accordance with claim 9, wherein the body part comprises at least one of a skin of the living user, and a brain of the living user.

11. A system in accordance with claim 2, wherein the capture device is wearable.

12. A system in accordance with claim 2, wherein the capture device comprises one or more implantable electrical neural signal sensors.

13. A system in accordance with claim 2, wherein the capture device comprises the output device.

14. A system in accordance with claim 1, further comprising:
   the output device further configured to generate and to deliver the electromagnetic stimulation to the living user through one or more electrodes to achieve one or more of a neural activation, excitation, transmission, and reception.

15. A system in accordance with claim 1, further comprising:
   the computer processor further configured to generate electromagnetic feedback and to deliver the electromagnetic feedback to the output device to achieve one or more of a neural response, action, reaction, and feedback in the living user.

16. A system in accordance with claim 1, wherein the computer processor, the storage device, the capture device, and the output device are interfaced using at least one of one or more wired and one or more wireless connections.

17. A system in accordance with claim 1, wherein the computer processor, the storage device, the capture device, and the output device comprise at least one of one or more analog components and one or more digital components.

18. A system in accordance with claim 1, further comprising:
the computer processor further configured to provide the recorded data to the living user via the output device;
a physiologic monitor configured to monitor the living user for a further plurality of points in the indexed sequence at which one or more of body responses and sensory responses as evoked by the living user in further reaction to the providing of the recorded data, are captured; and
the computer processor further configured to:
pair the captured one or more of the body responses and the sensory responses with further portions of the recorded data corresponding to the further plurality of points at which the captured one or more of the body responses and the sensory responses were evoked and reorganize the processing device the reorganized recorded data in the storage device as further categorized by the captured one or more of the body responses and the sensory responses;
measure and process the captured one or more of the body responses and the sensory responses with the processing device to identify one or more further physiologic responses that fall below the levels of self-awareness and cognitive awareness; and
inform the living user of the one or more further physiologic responses by providing the further reorganized recorded data via the output device as personalized to the living user's one or more further physiologic responses.

19. A system in accordance with claim 18, wherein at least one of one or more the further physiologic responses comprise one or more of the physiologic responses and one or more of the further physiologic responses are different from the physiologic responses.

20. A system in accordance with claim 18, wherein at least one of the physiologic responses and the further physiologic responses comprise at least one of one or more of sensory responses, one or more positive physiologic responses, one or more negative physiologic responses, one or more negative physiological responses, one or more neutral physiologic responses, one or more positive sensory responses, one or more negative sensor responses, and one or more neutral sensory responses.

21. A system in accordance with claim 18, wherein the physiologic responses and the further physiologic responses comprise one or more of:
one or more of a presence of, a change in and an absence of alertness, awareness, thought, emotion, feeling, interactions, physical activity, micro expressions, galvanic function, blood pressure, heart rate, heart profile, temperature, air movement, breathing, respiratory function, gas saturation, oxygenation levels, carbon dioxide levels, nitrogen levels, pulse oxygen levels, blood flow, pulse, thermal function, chemical, hormone changes, peptides, oxytocin, dopamine, organic neurochemicals, organic active chemicals, inorganically active chemicals, biologically active compounds, and biological compounds; and
one or more of a presence of, a change in, and an absence of the sensory responses that based on one or more of tactile, auditory, vision, gustatory, and olfactory senses.

22. A system in accordance with claim 21, wherein the tactile, auditory, vision, gustatory, and olfactory senses comprise one or more of touch, proprioception, pain, thermal, baro-awareness, vibration, motion detection, vestibular, dry sensation, wet sensation, kinetic movement, mechanical movement, nasal receptor stimuli, oral mucosal receptor stimuli sense, ear receptor sense, sound sense, vision, hearing, speaking, tasting, and smell.

23. A system in accordance with claim 1, wherein the output device is configured to output electrical, electromagnetic, magnetic, kinetic, and chemical signals.

24. A system in accordance with claim 1, wherein the output device comprises one or more electrodes.

25. A system in accordance with claim 1, further comprising:
the computer processor configured to generate feedback, comprising one or more of exciting, stimulating, speeding-up, inhibiting, suppressing, slowing-down, starting, stopping, and manipulating the recorded data, and to provide the feedback to a computing device through the output device.

26. A system in accordance with claim 1, wherein the output device is configured to provide output that is at least one of analog and digital.

27. A system in accordance with claim 1, wherein the output comprises sensory signals.

28. A system in accordance with claim 27, wherein the sensory signals comprise one or more of sight, visual, hearing, auditory, tactile, touch, olfactory, smell, gustatory, and taste signals.

* * * * *